(12) United States Patent
Lidgi et al.

(10) Patent No.: US 12,506,755 B2
(45) Date of Patent: *Dec. 23, 2025

(54) TECHNOLOGY DISCOVERY TECHNIQUES IN CLOUD COMPUTING ENVIRONMENTS UTILIZING DISK CLONING

(71) Applicant: Wiz, Inc., New York, NY (US)

(72) Inventors: Matilda Lidgi, Tel Aviv (IL); Shai Keren, Oporto (PT); Raaz Herzberg, Tel Aviv (IL); Avi Tal Lichtenstein, Tel Aviv (IL); Ami Luttwak, Binyamina (IL); Roy Reznik, Tel Aviv (IL); Daniel Hershko Shemesh, Givat-Shmuel (IL); Yarin Miran, Rishon Lezion (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,748

(22) Filed: Dec. 29, 2023

(65) Prior Publication Data

US 2024/0146745 A1 May 2, 2024

Related U.S. Application Data

(63) Continuation-in-part of application No. 17/818,883, filed on Aug. 10, 2022, and a continuation-in-part of application No. 17/664,508, filed on May 23, 2022.

(51) Int. Cl.
*H04L 9/40* (2022.01)
(52) U.S. Cl.
CPC ................ *H04L 63/1416* (2013.01)

(58) Field of Classification Search
CPC .................................................. H04L 63/1416
(Continued)

(56) References Cited

U.S. PATENT DOCUMENTS

| 6,910,132 B1 | 6/2005 | Bhattacharya |
| 7,627,652 B1 | 12/2009 | Commons et al. |

(Continued)

FOREIGN PATENT DOCUMENTS

| CN | 106462439 A | 2/2017 |
| CN | 109240804 A | 1/2019 |

(Continued)

OTHER PUBLICATIONS

Henry Hanping Feng; Anomaly Detection Using Call Stack Information; IEEE: Year:2003; pp. 1-14.*

(Continued)

*Primary Examiner* — Monjur Rahim
(74) *Attorney, Agent, or Firm* — M&B IP Analysts, LLC

(57) ABSTRACT

A system and method for technology stack discovery by performing active inspection of a cloud computing environment utilizing disk cloning is described. The method includes: generating an inspectable disk based on an original disk of a reachable resource, wherein the reachable resource is a cloud object deployed in the cloud computing environment, and accessible from a network which is external to the cloud computing environment; detecting a cybersecurity object on the inspectable disk, the cybersecurity object indicating a cybersecurity issue; selecting a network path including a network protocol to access the reachable resource; and actively inspecting the network path to detect the cybersecurity issue.

15 Claims, 11 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,784,101 B2 | 8/2010 | Verbowski et al. |
| 8,104,075 B2 | 1/2012 | Spector |
| 8,200,965 B2 | 6/2012 | Fujibayashi et al. |
| 8,320,558 B1 | 11/2012 | Zea |
| 8,352,431 B1 | 1/2013 | Protopopov et al. |
| 8,412,688 B1 | 4/2013 | Armangau et al. |
| 8,413,239 B2 | 4/2013 | Sutton |
| 8,417,967 B2 | 4/2013 | Foster et al. |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,813,234 B1 | 8/2014 | Bowers et al. |
| 8,898,481 B1 * | 11/2014 | Osburn, III ............ H04L 67/12 |
| | | | 713/192 |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1 | 10/2015 | Dippenaar |
| 9,185,136 B2 | 11/2015 | Dulkin et al. |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 * | 2/2017 | Pavlov ................ G06F 11/0718 |
| 9,582,662 B1 | 2/2017 | Messick et al. |
| 9,596,235 B2 | 3/2017 | Badam et al. |
| 9,607,104 B1 | 3/2017 | Turner et al. |
| 9,621,595 B2 | 4/2017 | Lian et al. |
| 9,646,172 B1 | 5/2017 | Hahn |
| 9,661,009 B1 * | 5/2017 | Karandikar ......... H04L 63/1408 |
| 9,665,465 B1 | 5/2017 | Jain et al. |
| 9,672,355 B2 | 6/2017 | Titonis et al. |
| 9,712,503 B1 | 7/2017 | Ahmed |
| 9,892,261 B2 | 2/2018 | Joram et al. |
| 9,992,186 B1 | 6/2018 | Drozd et al. |
| 10,002,247 B2 | 6/2018 | Suarez et al. |
| 10,009,337 B1 | 6/2018 | Fischer et al. |
| 10,032,032 B2 | 7/2018 | Suarez et al. |
| 10,044,723 B1 | 8/2018 | Fischer et al. |
| 10,063,445 B1 | 8/2018 | Preece |
| 10,135,826 B2 | 11/2018 | Reddy |
| 10,205,638 B1 | 2/2019 | Angrish et al. |
| 10,229,125 B2 | 3/2019 | Goodman et al. |
| 10,255,370 B2 | 4/2019 | Carpenter et al. |
| 10,360,025 B1 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,503,904 B1 | 12/2019 | Singh et al. |
| 10,509,909 B2 | 12/2019 | Andriani |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 * | 2/2020 | Siddiqui ............... G06F 21/562 |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 * | 4/2020 | Clark .................... G06F 21/606 |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,728,252 B2 | 7/2020 | Desai et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,887,333 B1 | 1/2021 | Pereira et al. |
| 10,915,626 B2 | 2/2021 | Tang |
| 10,924,503 B1 | 2/2021 | Pereira et al. |
| 10,949,406 B1 | 3/2021 | Calvo et al. |
| 10,972,484 B1 | 4/2021 | Swackhamer |
| 10,984,098 B1 | 4/2021 | Lavi et al. |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,216,563 B1 | 1/2022 | Veselov et al. |
| 11,245,730 B2 | 2/2022 | Bailey |
| 11,258,825 B1 | 2/2022 | Yang et al. |
| 11,271,961 B1 | 3/2022 | Berger |
| 11,334,670 B2 | 5/2022 | Franco et al. |
| 11,336,555 B2 | 5/2022 | Soh et al. |
| 11,366,897 B1 | 6/2022 | Ramanathan et al. |
| 11,388,183 B2 | 7/2022 | Hoopes et al. |
| 11,397,808 B1 | 7/2022 | Prabhu et al. |
| 11,405,426 B2 | 8/2022 | Nguyen |
| 11,418,528 B2 | 8/2022 | Deardorff et al. |
| 11,442,989 B2 | 9/2022 | Dvinov et al. |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,509,658 B1 | 11/2022 | Kulkarni |
| 11,516,222 B1 | 11/2022 | Srinivasan et al. |
| 11,520,907 B1 | 12/2022 | Borowiec et al. |
| 11,546,360 B2 * | 1/2023 | Woodford ............... G06F 21/36 |
| 11,556,659 B1 | 1/2023 | Kumar et al. |
| 11,558,401 B1 * | 1/2023 | Vashisht ............ H04L 63/1416 |
| 11,558,414 B1 | 1/2023 | Nguyen |
| 11,558,423 B2 * | 1/2023 | Gordon ............... H04L 63/0245 |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,593,485 B1 | 2/2023 | Briliauskas et al. |
| 11,606,378 B1 | 3/2023 | Delpont et al. |
| 11,614,956 B2 * | 3/2023 | Tsirkin .................. G06F 21/602 |
| | | | 713/193 |
| 11,645,390 B2 * | 5/2023 | Vijayvargiya ........ G06F 21/566 |
| | | | 726/23 |
| 11,651,055 B2 | 5/2023 | Saillet et al. |
| 11,662,928 B1 | 5/2023 | Kumar et al. |
| 11,663,340 B2 | 5/2023 | Wu et al. |
| 11,669,386 B1 * | 6/2023 | Abrol .................. G06F 11/1076 |
| | | | 714/15 |
| 11,695,785 B2 | 7/2023 | Ithal et al. |
| 11,700,233 B2 | 7/2023 | St. Pierre |
| 11,720,685 B2 | 8/2023 | Gwilliams |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,831,670 B1 | 11/2023 | Molls et al. |
| 11,836,250 B2 | 12/2023 | Grossman et al. |
| 11,841,945 B1 | 12/2023 | Fogel et al. |
| 11,902,282 B2 | 2/2024 | Ghiold et al. |
| 11,914,707 B1 | 2/2024 | Ramanathan et al. |
| 11,922,220 B2 * | 3/2024 | Haghighat ............... G06F 21/53 |
| 11,936,785 B1 | 3/2024 | Shemesh et al. |
| 11,960,609 B2 | 4/2024 | Gokhman et al. |
| 11,973,770 B1 | 4/2024 | Miran et al. |
| 11,991,216 B1 | 5/2024 | Venkatachari |

(56) References Cited

U.S. PATENT DOCUMENTS

| | | | |
|---|---|---|---|
| 12,003,541 B2 | 6/2024 | Shulman et al. | |
| 12,019,770 B2 | 6/2024 | Nilsson et al. | |
| 12,050,696 B2 | 7/2024 | Pieno et al. | |
| 12,058,177 B2 | 8/2024 | Crabtree et al. | |
| 12,063,305 B2 | 8/2024 | Ip et al. | |
| 12,164,652 B1 | 12/2024 | Li et al. | |
| 12,166,785 B2 | 12/2024 | Yellapragada et al. | |
| 2002/0133586 A1 | 9/2002 | Shanklin et al. | |
| 2002/0184486 A1 | 12/2002 | Kershenbaum et al. | |
| 2003/0188194 A1 | 10/2003 | Currie et al. | |
| 2003/0217039 A1 | 11/2003 | Kurtz et al. | |
| 2004/0054681 A1 | 3/2004 | Pitts | |
| 2005/0050365 A1 | 3/2005 | Seki et al. | |
| 2005/0071630 A1 | 3/2005 | Thornton et al. | |
| 2005/0251863 A1 | 11/2005 | Sima | |
| 2005/0283645 A1* | 12/2005 | Turner | G06F 11/1076 714/4.11 |
| 2007/0006304 A1 | 1/2007 | Kramer et al. | |
| 2007/0174915 A1 | 7/2007 | Gribble et al. | |
| 2007/0271360 A1 | 11/2007 | Sahita et al. | |
| 2008/0075283 A1 | 3/2008 | Takahashi | |
| 2008/0221833 A1 | 9/2008 | Brown et al. | |
| 2008/0307020 A1 | 12/2008 | Ko et al. | |
| 2008/0320594 A1 | 12/2008 | Jiang | |
| 2009/0106256 A1 | 4/2009 | Safari et al. | |
| 2009/0271863 A1 | 10/2009 | Govindavajhala et al. | |
| 2010/0242082 A1 | 9/2010 | Keene et al. | |
| 2010/0263049 A1 | 10/2010 | Cross et al. | |
| 2010/0274970 A1 | 10/2010 | Treuhaft et al. | |
| 2010/0281275 A1 | 11/2010 | Lee et al. | |
| 2011/0035802 A1 | 2/2011 | Arajujo, Jr. et al. | |
| 2011/0055361 A1 | 3/2011 | Dehaan | |
| 2011/0276806 A1 | 11/2011 | Casper et al. | |
| 2012/0110651 A1 | 5/2012 | Van Biljon et al. | |
| 2012/0255003 A1 | 10/2012 | Sallam | |
| 2012/0297206 A1 | 11/2012 | Nord et al. | |
| 2012/0311696 A1 | 12/2012 | Datsenko et al. | |
| 2013/0024940 A1 | 1/2013 | Hutchins et al. | |
| 2013/0054890 A1 | 2/2013 | Desai et al. | |
| 2013/0124669 A1 | 5/2013 | Anderson et al. | |
| 2013/0160119 A1 | 6/2013 | Sartin | |
| 2013/0160129 A1 | 6/2013 | Sartin | |
| 2013/0290708 A1 | 10/2013 | Diaz et al. | |
| 2014/0096134 A1 | 4/2014 | Barak | |
| 2014/0115578 A1 | 4/2014 | Cooper et al. | |
| 2014/0237537 A1 | 8/2014 | Manmohan | |
| 2014/0317677 A1 | 10/2014 | Vaidya | |
| 2014/0337613 A1 | 11/2014 | Martini | |
| 2015/0033305 A1 | 1/2015 | Shear | |
| 2015/0055647 A1 | 2/2015 | Roberts | |
| 2015/0058993 A1 | 2/2015 | Choi et al. | |
| 2015/0067850 A1 | 3/2015 | Baikalov | |
| 2015/0095995 A1 | 4/2015 | Bhalerao | |
| 2015/0150072 A1 | 5/2015 | Doctor et al. | |
| 2015/0161394 A1 | 6/2015 | Ferragut et al. | |
| 2015/0163192 A1 | 6/2015 | Jain | |
| 2015/0172321 A1 | 6/2015 | Kirti et al. | |
| 2015/0254364 A1* | 9/2015 | Piduri | G06F 16/904 715/234 |
| 2015/0304302 A1 | 10/2015 | Zhang et al. | |
| 2015/0310215 A1 | 10/2015 | McBride et al. | |
| 2015/0319160 A1 | 11/2015 | Ferguson et al. | |
| 2016/0063037 A1 | 3/2016 | Savkli | |
| 2016/0063466 A1 | 3/2016 | Sheridan et al. | |
| 2016/0078231 A1 | 3/2016 | Bach et al. | |
| 2016/0103669 A1 | 4/2016 | Gamage et al. | |
| 2016/0105454 A1 | 4/2016 | Li | |
| 2016/0140352 A1 | 5/2016 | Nickolov | |
| 2016/0156664 A1 | 6/2016 | Nagaratnam | |
| 2016/0224600 A1* | 8/2016 | Munk | G06Q 20/08 |
| 2016/0299708 A1 | 10/2016 | Yang et al. | |
| 2016/0366185 A1 | 12/2016 | Lee et al. | |
| 2017/0026416 A1 | 1/2017 | Carpenter et al. | |
| 2017/0034198 A1 | 2/2017 | Powers et al. | |
| 2017/0070506 A1 | 3/2017 | Reddy | |
| 2017/0104755 A1 | 4/2017 | Arregoces | |
| 2017/0111384 A1* | 4/2017 | Loureiro | H04L 63/1433 |
| 2017/0126712 A1 | 5/2017 | Crabtree et al. | |
| 2017/0163650 A1 | 6/2017 | Seigel et al. | |
| 2017/0185784 A1 | 6/2017 | Madou | |
| 2017/0187686 A1 | 6/2017 | Shaikh et al. | |
| 2017/0187743 A1 | 6/2017 | Madou | |
| 2017/0200122 A1 | 7/2017 | Edson et al. | |
| 2017/0223024 A1 | 8/2017 | Desai | |
| 2017/0230179 A1 | 8/2017 | Mannan et al. | |
| 2017/0237560 A1 | 8/2017 | Mueller et al. | |
| 2017/0257347 A1 | 9/2017 | Yan | |
| 2017/0285978 A1 | 10/2017 | Manasse | |
| 2017/0300690 A1 | 10/2017 | Ladnai et al. | |
| 2017/0374136 A1 | 12/2017 | Ringdahl | |
| 2018/0004950 A1 | 1/2018 | Gupta et al. | |
| 2018/0007087 A1 | 1/2018 | Grady et al. | |
| 2018/0026995 A1 | 1/2018 | Dufour et al. | |
| 2018/0027009 A1 | 1/2018 | Santos et al. | |
| 2018/0063290 A1 | 3/2018 | Yang et al. | |
| 2018/0083987 A1 | 3/2018 | Kislitsin | |
| 2018/0101622 A1 | 4/2018 | Helvik et al. | |
| 2018/0137174 A1 | 5/2018 | Cahana et al. | |
| 2018/0150412 A1 | 5/2018 | Manasse | |
| 2018/0159882 A1 | 6/2018 | Brill | |
| 2018/0181310 A1 | 6/2018 | Feinberg et al. | |
| 2018/0191726 A1 | 7/2018 | Luukkala | |
| 2018/0219888 A1 | 8/2018 | Apostolopoulos | |
| 2018/0234459 A1 | 8/2018 | Kung | |
| 2018/0239902 A1 | 8/2018 | Godard | |
| 2018/0248902 A1 | 8/2018 | Dănilă-Dumitrescu et al. | |
| 2018/0260566 A1 | 9/2018 | Chaganti et al. | |
| 2018/0270268 A1 | 9/2018 | Gorodissky et al. | |
| 2018/0276084 A1 | 9/2018 | Mitkar et al. | |
| 2018/0278639 A1 | 9/2018 | Bernstein et al. | |
| 2018/0288129 A1 | 10/2018 | Joshi et al. | |
| 2018/0307736 A1 | 10/2018 | Balakrishnan et al. | |
| 2018/0309747 A1 | 10/2018 | Sweet et al. | |
| 2018/0321993 A1 | 11/2018 | McClory et al. | |
| 2018/0341768 A1 | 11/2018 | Marshall et al. | |
| 2018/0349612 A1 | 12/2018 | Harel et al. | |
| 2018/0359058 A1 | 12/2018 | Kurian | |
| 2018/0359059 A1 | 12/2018 | Kurian | |
| 2018/0367548 A1 | 12/2018 | Stokes, III et al. | |
| 2019/0007271 A1 | 1/2019 | Rickards et al. | |
| 2019/0043201 A1 | 2/2019 | Strong et al. | |
| 2019/0058722 A1 | 2/2019 | Levin et al. | |
| 2019/0068617 A1 | 2/2019 | Coleman | |
| 2019/0068627 A1 | 2/2019 | Thampy | |
| 2019/0081963 A1 | 3/2019 | Waghorn | |
| 2019/0089720 A1 | 3/2019 | Aditham et al. | |
| 2019/0095626 A1 | 3/2019 | Mohan | |
| 2019/0104140 A1 | 4/2019 | Gordeychik et al. | |
| 2019/0116111 A1* | 4/2019 | Izard | H04L 45/745 |
| 2019/0121986 A1 | 4/2019 | Stopel et al. | |
| 2019/0132350 A1* | 5/2019 | Smith | G06F 21/60 |
| 2019/0149604 A1 | 5/2019 | Jahr | |
| 2019/0166129 A1 | 5/2019 | Gaetjen et al. | |
| 2019/0171811 A1 | 6/2019 | Daniel et al. | |
| 2019/0191417 A1 | 6/2019 | Baldemair et al. | |
| 2019/0205267 A1 | 7/2019 | Richey et al. | |
| 2019/0207966 A1 | 7/2019 | Vashisht et al. | |
| 2019/0220298 A1 | 7/2019 | Jiao et al. | |
| 2019/0220575 A1 | 7/2019 | Boudreau et al. | |
| 2019/0229915 A1 | 7/2019 | Digiambattista et al. | |
| 2019/0235900 A1 | 8/2019 | Singh et al. | |
| 2019/0236409 A1 | 8/2019 | Van Der Stockt et al. | |
| 2019/0245883 A1 | 8/2019 | Gorodissky et al. | |
| 2019/0260764 A1 | 8/2019 | Humphrey et al. | |
| 2019/0266508 A1 | 8/2019 | Bunyk et al. | |
| 2019/0278928 A1 | 9/2019 | Rungta et al. | |
| 2019/0327258 A1 | 10/2019 | Choi et al. | |
| 2019/0327271 A1 | 10/2019 | Saxena et al. | |
| 2019/0334715 A1 | 10/2019 | Gray | |
| 2019/0354675 A1 | 11/2019 | Gan et al. | |
| 2019/0377988 A1 | 12/2019 | Qi et al. | |
| 2020/0007314 A1 | 1/2020 | Vouk et al. | |
| 2020/0007569 A1 | 1/2020 | Dodge et al. | |
| 2020/0012659 A1 | 1/2020 | Dageville et al. | |

(56) References Cited

U.S. PATENT DOCUMENTS

| | | |
|---|---|---|
| 2020/0012818 A1 | 1/2020 | Levin et al. |
| 2020/0021994 A1 | 1/2020 | Ranjbar et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0074360 A1 | 3/2020 | Humphries et al. |
| 2020/0082094 A1 | 3/2020 | McAllister et al. |
| 2020/0106782 A1 | 4/2020 | Sion |
| 2020/0117434 A1 | 4/2020 | Biskup et al. |
| 2020/0125352 A1 | 4/2020 | Kannan |
| 2020/0137097 A1 | 4/2020 | Zimmermann et al. |
| 2020/0137125 A1 | 4/2020 | Patnala et al. |
| 2020/0145405 A1 | 5/2020 | Bosch et al. |
| 2020/0175171 A1 | 6/2020 | Rieger et al. |
| 2020/0186416 A1 | 6/2020 | Hashimoto et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0287927 A1 | 9/2020 | Zadeh et al. |
| 2020/0320189 A1 | 10/2020 | Zhang et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0006574 A1 | 1/2021 | Venter et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0056548 A1 | 2/2021 | Monica et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1* | 5/2021 | Hill ........................ G10L 21/10 |
| 2021/0168150 A1 | 6/2021 | Ross et al. |
| 2021/0173939 A1 | 6/2021 | Kotler et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0194678 A1 | 6/2021 | Schindewolf et al. |
| 2021/0200881 A1 | 7/2021 | Joshi et al. |
| 2021/0203684 A1 | 7/2021 | Maor et al. |
| 2021/0203761 A1 | 7/2021 | Ahn et al. |
| 2021/0211453 A1 | 7/2021 | Cooney |
| 2021/0216591 A1 | 7/2021 | Dvinov et al. |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0232344 A1 | 7/2021 | Corrie |
| 2021/0234889 A1* | 7/2021 | Burle .................. H04L 63/1433 |
| 2021/0248443 A1 | 8/2021 | Shu et al. |
| 2021/0263802 A1 | 8/2021 | Gottemukkula et al. |
| 2021/0273953 A1 | 9/2021 | Fellows et al. |
| 2021/0297447 A1 | 9/2021 | Crabtree et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0326883 A1 | 10/2021 | Misra et al. |
| 2021/0329019 A1 | 10/2021 | Shua et al. |
| 2021/0334386 A1* | 10/2021 | AlGhamdi ............... G06F 9/542 |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1* | 12/2021 | Yi ........................ G06F 21/577 |
| 2021/0400071 A1 | 12/2021 | Ray et al. |
| 2021/0406365 A1 | 12/2021 | Neil et al. |
| 2021/0409486 A1 | 12/2021 | Martinez |
| 2022/0004410 A1 | 1/2022 | Chen |
| 2022/0012771 A1 | 1/2022 | Gustafson |
| 2022/0030020 A1 | 1/2022 | Huffman |
| 2022/0035862 A1 | 2/2022 | Ben-Natan |
| 2022/0035905 A1 | 2/2022 | Lu et al. |
| 2022/0036302 A1 | 2/2022 | Cella et al. |
| 2022/0053011 A1 | 2/2022 | Rao et al. |
| 2022/0060497 A1 | 2/2022 | Crabtree et al. |
| 2022/0086173 A1 | 3/2022 | Yavo et al. |
| 2022/0100869 A1 | 3/2022 | Berger et al. |
| 2022/0131888 A1 | 4/2022 | Kanso |
| 2022/0138512 A1 | 5/2022 | Saillet et al. |
| 2022/0156396 A1* | 5/2022 | Bednash ............... G06F 21/554 |
| 2022/0164111 A1 | 5/2022 | Yang et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0188689 A1 | 6/2022 | Gunawardana et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0326941 A1 | 10/2022 | Nelson et al. |
| 2022/0327119 A1 | 10/2022 | Gasper et al. |
| 2022/0335340 A1 | 10/2022 | Moustafa et al. |
| 2022/0342690 A1 | 10/2022 | Shua |
| 2022/0342997 A1 | 10/2022 | Watanabe et al. |
| 2022/0345480 A1 | 10/2022 | Shua |
| 2022/0345481 A1 | 10/2022 | Shua |
| 2022/0350931 A1 | 11/2022 | Shua |
| 2022/0357992 A1 | 11/2022 | Karpovsky |
| 2022/0358233 A1 | 11/2022 | Thakur et al. |
| 2022/0360958 A1 | 11/2022 | Cui et al. |
| 2022/0374519 A1 | 11/2022 | Botelho et al. |
| 2022/0382784 A1 | 12/2022 | Osuala et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1* | 12/2022 | Upadhyay ............. G06F 16/256 |
| 2022/0417011 A1 | 12/2022 | Shua |
| 2022/0417219 A1 | 12/2022 | Sheriff |
| 2023/0007014 A1 | 1/2023 | Narayan |
| 2023/0011957 A1 | 1/2023 | Panse et al. |
| 2023/0019015 A1 | 1/2023 | Ahmed |
| 2023/0027210 A1 | 1/2023 | Shelton, IV et al. |
| 2023/0032686 A1 | 2/2023 | Williams et al. |
| 2023/0036145 A1 | 2/2023 | Ramachandran et al. |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1 | 3/2023 | Shua |
| 2023/0095756 A1 | 3/2023 | Wilkinson et al. |
| 2023/0102103 A1 | 3/2023 | Mazumder et al. |
| 2023/0110080 A1 | 4/2023 | Hen |
| 2023/0114821 A1 | 4/2023 | Tuckman |
| 2023/0123477 A1* | 4/2023 | Luttwak ............... H04L 63/1425 726/25 |
| 2023/0125134 A1* | 4/2023 | Raleigh ............... H04L 63/1408 455/410 |
| 2023/0134674 A1* | 5/2023 | Quinn ................. G06F 11/1458 714/15 |
| 2023/0135240 A1 | 5/2023 | Cody et al. |
| 2023/0136839 A1 | 5/2023 | Sundararajan et al. |
| 2023/0161614 A1 | 5/2023 | Herzberg et al. |
| 2023/0161870 A1 | 5/2023 | Herzberg et al. |
| 2023/0164148 A1 | 5/2023 | Narayan |
| 2023/0164164 A1 | 5/2023 | Herzberg et al. |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1* | 6/2023 | Horowitz ............... B65G 47/46 198/349 |
| 2023/0208855 A1 | 6/2023 | Sheriff et al. |
| 2023/0208870 A1* | 6/2023 | Yellapragada .......... G06F 21/53 726/22 |

(56) References Cited

U.S. PATENT DOCUMENTS

| | | | |
|---|---|---|---|
| 2023/0224319 A1 | 7/2023 | Isoyama et al. | |
| 2023/0229764 A1 | 7/2023 | Vohra et al. | |
| 2023/0231867 A1 | 7/2023 | Rampura Venkatachar | |
| 2023/0237068 A1* | 7/2023 | Sillifant | G06F 16/211 707/626 |
| 2023/0254330 A1 | 8/2023 | Singh | |
| 2023/0297666 A1 | 9/2023 | Atamli et al. | |
| 2023/0325814 A1* | 10/2023 | Vijayan | G06Q 20/3829 705/66 |
| 2023/0336550 A1 | 10/2023 | Lidgi et al. | |
| 2023/0336578 A1 | 10/2023 | Lidgi et al. | |
| 2023/0376586 A1 | 11/2023 | Shemesh et al. | |
| 2024/0007492 A1* | 1/2024 | Shen | H04L 63/1425 |
| 2024/0037229 A1* | 2/2024 | Pab?n | G06F 9/45558 |
| 2024/0045838 A1 | 2/2024 | Reiss et al. | |
| 2024/0073115 A1 | 2/2024 | Chakraborty et al. | |
| 2024/0080329 A1* | 3/2024 | Reed | H04L 67/306 |
| 2024/0080332 A1 | 3/2024 | Ganesh et al. | |
| 2024/0146818 A1 | 5/2024 | Cody et al. | |
| 2024/0202359 A1 | 6/2024 | Shukla et al. | |
| 2024/0241752 A1 | 7/2024 | Crabtree et al. | |
| 2024/0259396 A1 | 8/2024 | Kerkar et al. | |
| 2024/0370880 A1 | 11/2024 | Jeske et al. | |
| 2025/0055870 A1 | 2/2025 | Viswambharan et al. | |
| 2025/0086280 A1 | 3/2025 | Murphy et al. | |

FOREIGN PATENT DOCUMENTS

| | | |
|---|---|---|
| CN | 112989379 A | 6/2021 |
| EP | 4160983 A1 | 4/2023 |
| EP | 4254869 A2 | 10/2023 |
| JP | 2017120492 A | 7/2017 |
| RU | 2421792 C2 | 6/2011 |
| SG | 10202009702X | 4/2021 |
| SG | 11202103226 U | 4/2021 |
| WO | 2004034184 A2 | 4/2004 |

OTHER PUBLICATIONS

Ali Gholami; Security and Privacy of Sensitive Data in Cloud Computing: a Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Leibenger, Dominik et al. EncFS goes multi-user: Adding access control to an encrypted file system. 2016 IEEE Conference on Communications and Network Security (CNS). https://ieeexplore.ieee.org/stamp/stamp.jsp?tp=&arnumber=7860544 (Year: 2016).

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Sahil Suneja; Safe Inspection of Live Virtual Machines; IEEE; Year:2017; pp. 97-111.

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Siqi Ma; Certified Copy? Understanding Security Risks of Wi-Fi Hotspot based Android Data Clone Services; ACM; Year: 2021; pp. 320-331.

Written Opinion of the International Searching Authority for PCT Application No. PCT/IB2022/060940 dated Feb. 1, 2023. The International Bureau of WIPO.

Written Opinion of the Searching Authority for PCT/IB2023/050848, dated May 9, 2023. International Bureau of WIPO.

Zhang et al. BMC Bioinformatics 2014. "On finding bicliques in bipartite graphs: a novel algorithm and its application to the integration of diverse biological data types". http://www.biomedcentral.com/1471-2105/15/110.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/stamp.jsp?tp=&arnumber=9250645 (Year: 2020).

CopySnapshot—Amazon Elastic Compute Cloud—Published Oct. 20, 2021 (Year: 2021).

Decrypt—AWS Key Management Service—Published Oct. 27, 2021 (Year: 2021).

How to share encrypted AMIs across accounts to launch encrypted EC2 instances—Published May 13, 2019 (Year: 2019).

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Microsoft Build. "Introduction to Azure managed disks". Aug. 21, 2023, https://docs.microsoft.com/en-us/azure/virtual-machines/managed-disks-overview.

Written Opinion of the International Searching Authority, PCT/IB23/55312. ISA/US Commissioner for Patents, Alexandria, Virginia. Dated Aug. 30, 2023.

Written Opinion of the Searching Authority of PCT/IB2023/058074, dated Nov. 20, 2023. Searching Authority United States Patent and Trademark Office, Alexandria, Virginia.

AWS, AWS managed policies for job functions, Oct. 26, 2021, https://web.archive.org/web/20211026212847/https://docs.aws.amazon.com/IAM/latesUUserGuide/access_policiesjob-functions.html (Year: 2021).

Christie Koehler, Detecting and Managing Drift with Terraform, Jun. 7, 2018, https://www.hashicorp.com/en/blog/detecting-and-managing-drift-with-terraform (Year: 2018).

Extended European Search Report for EP 23746586.9 dated Jul. 23, 2025. European Patent Office, Munich, Germany.

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete (Year: 2021).

(56) References Cited

OTHER PUBLICATIONS

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete/main.tf (Year: 2021).

Google, Shift security left with on-demand vulnerability scanning, Aug. 25, 2021 https://cloud.google.com/blog/products/identity-security/scan-for-vulnerabilities-early-to-shift-security-left-in-cicd (Year: 2021).

Proxify, Mastering good programming practices: A comprehensive guide, Apr. 27, 2021, https://proxify.io/articles/good-programming-practices (Year: 2021).

Reddit, 1AM Roles for each Lambda?, Aug. 25, 2019 (Year: 2019).

Bringhenti Daniele et al.: "A novel approach for security function graph configuration and deployment", 2021 IEEE 7TH International Conference on Network Softwarization (Netsoft), IEEE, Jun. 28, 2021 (Jun. 28, 2021), pp. 457-463, XP033948302, DOI: 10.1109/NETSOFT51509.2021.9492654 [retrieved on Jul. 20, 2021] * abstract * * Sections I-III *.

Espinha Gasiba Tiago Tiago Gasiba@Siemens Com et al.: "Raising Security Awareness of Cloud Deployments using Infrastructure as\ Code through CyberSecurity Challenges", Proceedings of the 1st Conference on Mile-High Video, ACMPUB27, New York, NY, USA, Aug. 17, 2021 (Aug. 17, 2021), pp. 1-8, XP058860050, DOI: 10.1145/3465481.3470030 ISBN: 978-1-4503-9606-6 * abstract * * Sections 1-3 *.

Extended European Search Report and Opinion for EP 22898020.7, dated Sep. 9, 2025. European Patent Office, Munich, Germany.

European Search Report and Opinion for EP application 23811275.9, dated Sep. 25, 2025. European Patent Office, Munich, Germany.

* cited by examiner

403 Forbidden — 510

- Code: AccessDenied
- Message: Access Denied
- RequestId: 09PP3N3S90KVTGWW
- HostId: nGXESStwa0loje3nta9X81xD4e3eD1W1aArrL61yDestHU8puUX24XUv9CD/4RQHFarJjAuuDl=

TECHNOLOGY DISCOVERY TECHNIQUES IN CLOUD COMPUTING ENVIRONMENTS UTILIZING DISK CLONING

CROSS-REFERENCE TO RELATED APPLICATIONS

This application is a continuation-in-part of U.S. Non-Provisional Application Ser. No. 17/818,883 filed Aug. 10, 2022, and a continuation-in-part of U.S. Non-Provisional application Ser. No. 17/664,508 filed May 23, 2022, all contents of which are hereby incorporated by reference herein.

TECHNICAL FIELD

The present disclosure relates generally to cybersecurity inspection, and specifically to utilizing disk cloning for detecting cybersecurity issues and validating them through active inspection.

BACKGROUND

External attack surface management (EASM) is a term which for a technology field and best practices which are utilized in cybersecurity to describe what vulnerabilities an organization has within their network infrastructure, which may include cloud computing environments, local network environments, and the like. For example, an organization may have a virtual private cloud (VPC) implemented in Amazon® Web Services (AWS), Microsoft® Azure, Google® Cloud Platform (GCP), and the like, which serves as a cloud computing environment. The cloud computing environment may include a plurality of workloads, such as virtual machines, container engines, serverless functions, and the like, any of which may pose a security risk, for example by having a vulnerability, allowing an attacker to infiltrate the organization's network in an unintended manner.

EASM technologies aim to discover where an organization is vulnerable, in order for a network administrator to secure the discovered vulnerabilities. For example, discovering an out-of-date operating system (OS) having a known vulnerability running on a virtual machine may require the network administrator to update the OS version, or apply a software patch, in order to address the vulnerability. This is also known as minimizing the external attack surface.

One such technology which may be deployed in order to discover the external attack surface is known is active scanning. Active scanning attempts to infiltrate a network (e.g., access resources in the above mentioned VPC). For example, by sending packets to endpoints in the network. Thus, an active scanner may attempt to access random domains, at random ports, in order to gain access to a network or to a network resource.

This method has some serious drawbacks. For example, attempting to guess random domains, random ports, and the like, creates a large volume of network traffic which the target (i.e., organization's network) must deal with. This may congest the network, and further risks malfunctions, such as a denial of service to other clients, data corruption from incompatible queries, and the like. It is often of upmost importance to an organization to keep a production environment in a fully operational state. Therefore, using an active scanner to test accessibility of an active production environment may be detrimental to this objective, since it would require devotion of substantial resources at least in terms of network bandwidth to perform such tests.

A cloud computing environment may limit the number of open ports the network provides, however in practice that limitation is often limited, opting instead to limit port access at the resource level. Thus, in order to discover if a resource includes an open port, a port scan may be utilized. A port scan involves determining what ports in a network, or network element (such as the resource), are open. An open port receives information. Port numbers range from 0 to 65535, thus performing a full scan for each port, to determine if the port of a particular resource is open, is computationally intensive.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating an inspectable disk based on an original disk of a reachable resource, where the reachable resource is a cloud object deployed in the cloud computing environment, and accessible from a network which is external to the cloud computing environment. Method may also include detecting a cybersecurity object on the inspectable disk, the cybersecurity object indicating a cybersecurity issue. Method may furthermore include selecting a network path including a network protocol to access the reachable resource. Method may in addition include actively inspecting the network path to detect the cybersecurity issue. Other embodiments of this aspect include corresponding computer systems, apparatus, and computer programs recorded on one or more computer storage devices, each configured to perform the actions of the methods.

Implementations may include one or more of the following features. Method where actively inspecting further comprises: inspecting the network path to determine if an application utilizing the network protocol is deployed on the reachable resource as part of a technology stack of the reachable resource. Method may include: generating an access instruction, where the access instruction when executed configures a computing device to send an instruction to the reachable resource over the network path, causing the reachable resource to send a response. Method may include: determining that an application is deployed in response to receiving a response from the reachable resource corresponding to the network protocol; and determining that the application is not deployed in response to receiving an error response from the reachable resource. Method where the network protocol is any one of: hypertext transfer protocol (HTTP), file transfer protocol (FTP), secure shell (SSH), simple mail transfer protocol (SMTP), post office protocol (POP3), internet message access protocol (IMAP), internet relay chat (IRC), and HTTP secure (HTTPS). Method may include: querying a security database to detect an open port of the reachable resource, where the security database includes a representation of the cloud computing environment. Method where the open port is associated with the network protocol and another network protocol. Method may include: generating a first access instruction based on the network path and the network protocol; and generating a second access instruction based on the network path and the another network protocol. Method may include: actively inspecting the network path by executing the second access instruction, in response to receiving an error from the reachable resource in response to executing the first access instruction. Implementations of the described techniques may include hardware, a method or process, or a computer tangible medium.

In one general aspect, non-transitory computer-readable medium may include one or more instructions that, when executed by one or more processors of a device, cause the device to: generate an inspectable disk based on an original disk of a reachable resource, where the reachable resource is a cloud object deployed in the cloud computing environment, and accessible from a network which is external to the cloud computing environment. Medium may furthermore detect a cybersecurity object on the inspectable disk, the cybersecurity object indicating a cybersecurity issue. Medium may in addition select a network path including a network protocol to access the reachable resource. Medium may moreover actively inspect the network path to detect the cybersecurity issue. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate an inspectable disk based on an original disk of a reachable resource, where the reachable resource is a cloud object deployed in the cloud computing environment, and accessible from a network which is external to the cloud computing environment. System may in addition detect a cybersecurity object on the inspectable disk, the cybersecurity object indicating a cybersecurity issue. System may moreover select a network path including a network protocol to access the reachable resource. System may also actively inspect the network path to detect the cybersecurity issue. Other embodiments of this aspect include corresponding computer systems, apparatus, and computer programs recorded on one or more computer storage devices, each configured to perform the actions of the methods.

Implementations may include one or more of the following features. System where the memory contains further instructions that, when executed by the processing circuitry for actively inspecting, further configure the system to: inspect the network path to determine if an application utilizing the network protocol is deployed on the reachable resource as part of a technology stack of the reachable resource. System where the memory contains further instructions which when executed by the processing circuitry further configure the system to: generate an access instruction, where the access instruction when executed configures a computing device to send an instruction to the reachable resource over the network path, causing the reachable resource to send a response. System where the memory contains further instructions which when executed by the processing circuitry further configure the system to: determine that an application is deployed in response to receiving a response from the reachable resource corresponding to the network protocol; and determine that the application is not deployed in response to receiving an error response from the reachable resource. System where the network protocol is any one of: hypertext transfer protocol (HTTP), file transfer protocol (FTP), secure shell (SSH), simple mail transfer protocol (SMTP), post office protocol (POP3), internet message access protocol (IMAP), internet relay chat (IRC), and HTTP secure (HTTPS). System where the memory contains further instructions which when executed by the processing circuitry further configure the system to: query a security database to detect an open port of the reachable resource, where the security database includes a representation of the cloud computing environment. System where the open port is associated with the network protocol and another network protocol. System where the memory contains further instructions which when executed by the processing circuitry further configure the system to: generate a first access instruction based on the network path and the network protocol; and generate a second access instruction based on the network path and the another network protocol. System where the memory contains further instructions which when executed by the processing circuitry further configure the system to: actively inspect the network path by executing the second access instruction, in response to receiving an error from the reachable resource in response to executing the first access instruction. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
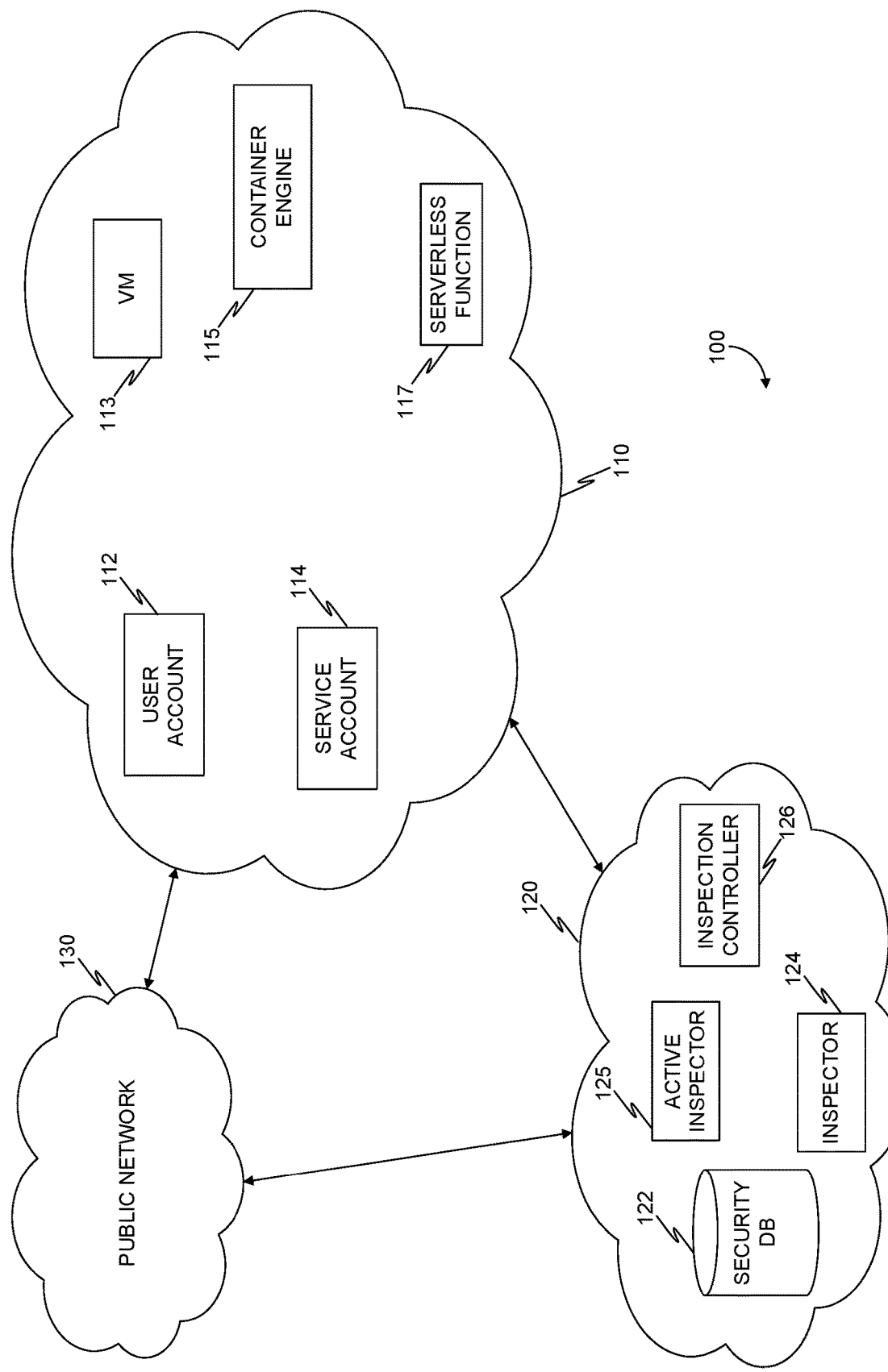
FIG. 1 is an example diagram of a cloud computing environment monitored by an active inspector, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and a method for discovering a technology stack on a resource deployed in a cloud computing environment. In an embodiment a technology stack (or "tech stack") includes a collection of software files, such as an application, an operating system, a driver, a file system, and the like which are installed or deployed on a resource, such as a virtual machine, which in turn is deployed in a cloud computing environment. For example, Nginx® deployed on a virtual machine having a Linux® operating system has a technology stack (also referred to as a tech stack) which includes Nginx and Linux. In an embodiment a reachable resource is selected. A network protocol is detected for the reachable resource. In some embodiments, a security graph representing the cloud computing environment is traversed to determine what network protocol is available on the reachable resource. A network protocol may be, for example, a TCP protocol, UDP protocol, and the like. The network protocol may include an open port, on which an application of the reachable resource is listening. An open port does not necessarily indicate though what application is listening on that port.

Active inspection allows to generate instructions directed at the reachable resource over a network path, which when received by the reachable resource cause the reachable resource to send a response. For example, a reachable resource may have indicated that port 22 is an open port. Port 22 is typically associated with secure shell (SSH) protocol. In certain embodiments, a port may be associated with a plurality of applications, each application associated with an access instruction. An SSH session may be initiated with the reachable resource having an IP address at 10.0.0.256 on port 22, by providing an access instruction including "ssh user@10.0.0.256:22".

Discovering an application using the methods described herein allows to validate a tech stack as part of an external attack surface management (EASM) procedure in an efficient way, since only ports which are indicated, for example by static analysis, as being open are inspected to determine if access may occur. In an embodiment, only predetermined applications are checked for each open port, which further reduces the number of access instructions required to probe open ports, as the alternative is to test each probe for each application, which can easily result in hundreds of thousands of access instructions required to determine what applications are deployed on just a single resource.

Various techniques of static analysis can be used in order to determine reachability properties of a resource deployed in a cloud computing environment. Reachability properties, or parameters, may be utilized to establish a network path to the resource from an external network through the cloud computing environment. An access instruction may be generated based on the network path to determine if a network path generated through static analysis is indeed a viable path to reach the resource. Determining what network paths are viable is advantageous as it exposes what network paths can be used to access the cloud computing environment from external networks, and therefore what parts of the cloud computing environment are in practice opened to attack. These network paths should be addressed by system administrators as early as possible to minimize the effect of a cyber-attack.

FIG. 1 is an example diagram 100 of a cloud computing environment monitored by an active inspector, implemented in accordance with an embodiment. A first computing environment 110, also referred to as a cloud environment 110, includes a plurality of principals and resources. A resource is a cloud entity which supplies functionality, such as processing power, memory, storage, communication, and the like. A resource may supply more than one functionality. Resources may include, for example, virtual machines (VMs) such as VMs 113, container engines such as container engines 115, serverless functions such as serverless functions 117, and the like. A VM may be implemented using Oracle® VirtualBox. A container engine may be implemented using Kubernetes® or Docker®. A serverless function may implemented using Lambda®.

A principal is a cloud entity which acts on a resource, meaning it can request, or otherwise initiate, actions or operations in the cloud environment which cause a resource to perform a function. A principal may be, for example, a user account such as user account 112, a service account such as service account 114, a role, and the like. In an embodiment a user account 112 is implemented as a data structure which includes information about an entity, such as username, a password hash, an associated role, and the like.

The first cloud environment 110 may be implemented utilizing a cloud infrastructure, such as Amazon® Web Services (AWS), Microsoft® Azure, Google® Cloud Platform (GCP), and the like. In an embodiment, the first cloud environment 110 may be implemented as a virtual private cloud (VPC) on such a cloud infrastructure. The first cloud environment 110 may be, for example, a production environment for an organization. A production environment is a computing environment which provides services, for example, to client devices within the production environment and outside of it. An organization may also have a staging environment, which is a computing environment substantially identical to the production environment in at least some deployments of resource (e.g., workloads) which is used for the purpose of testing new policies, new permissions, new applications, new appliances, new resources, and the like, which are not present in the production environment.

It is often of upmost importance to an organization to keep the production environment in a fully operational state. Therefore, using an active scanner to test accessibility to the first cloud environment 110 may be detrimental to this objective, since it would require devotion of substantial resources at least in terms of network bandwidth to perform such tests.

An inspection environment 120 is communicatively connected with the first cloud environment 110, and a public network 130. The public network 130 is also communicatively connected with the first cloud environment 110. In an embodiment, the public network 130 may be, but is not limited to, a wireless, cellular or wired network, a local area network (LAN), a wide area network (WAN), a metro area network (MAN), the Internet, the worldwide web (WWW), similar networks, and any combination thereof.

The inspection environment 120 may be implemented as a VPC in a cloud infrastructure. In an embodiment, the cloud infrastructure of the inspection environment 120 may be the same cloud infrastructure as the first cloud environment 110. In some embodiments, the inspection environment may be implemented as multiple cloud environments, each utilizing a cloud infrastructure. The inspection environment includes a security graph database (DB) 122 for storing a security graph, and at least an active inspector 125.

In an embodiment, the security graph stored in the security graph DB 122 represents at least the first cloud environment 110 using a predefined data schema. For example, each resource and each principal of the first cloud environment 110 may be represented as a corresponding resource node or principal node in the security graph. The various nodes in the security graph may be connected, for example, based on policies, roles, permissions, and the like, which are detected in the first cloud environment 110. A predefined data schema may include data structures including into which values can be inputted to represent a specific cloud entity. For example, a resource may be represented by a template data structure which includes data attributes, whose values uniquely identify the resource, such as address, name, type, OS version, and the like.

The active inspector 125 is configured to receive a network path to access a resource in the first cloud environment 110. In an embodiment, a network path may be stored as a data string which includes one or more reachability parameters. Such parameters include host names, protocols, IP addresses, ports, usernames, passwords, and the like. In certain embodiments, the active inspector 125 is further configured to receive a list of network paths. The network paths may be received periodically. In certain embodiments, the active inspector 125 is also configured to generate an instruction which includes a query for the security graph, Such instruction or instructions when executed by the security graph database 122 cause(s) generation of an output including one or more network paths. For example, network paths may be generated every 24 hours, while active inspection may occur once per day, once per week, once per month, and so on.

An example of a static analysis process for generating network paths, also known as determining reachability to a resource, is discussed in more detail in U.S. Pat. No. 11,374,982, the contents of which are hereby incorporated by reference herein. In an embodiment, the active inspector 125 may generate an instruction based on the network path to access the resource associated with the network path. For example, the instruction may be to send a data packet to an IP address of the resource, and receive an acknowledgement (ACK) response. The active inspector 125 may generate a log which includes, for example, the network path, the instruction sent by the active inspector 125, and any response(s) received from the resource. For example, if the active inspector 125 sends an HTTP (hypertext transfer protocol) request, a response may be a 404 error, a 403 error, 500 error, 502 error, and the like.

In an embodiment the active inspector 125 initiates active inspection of a network path to determine if a resource is accessible via the network path from a network which is external to the first cloud environment 110.

In some embodiments, the inspection environment 120 includes an inspector 124, and an inspection controller 126. In an embodiment, an inspector 124 is configured to detect a cybersecurity object on a workload deployed in the computing environment 110. For example, in an embodiment, the virtual machine 113 is associated with a disk (e.g., an original disk).

In certain embodiments, an inspection controller 126 is configured to generate a cloned disk from the original disk. In an embodiment, the inspection controller 126 is configured to provide the inspector 124 access to the cloned disk for inspection.

In an embodiment, the inspection controller 126 is configured to initiate active inspection (i.e., by the active inspector 125122) based on a result generated by an inspector 124.

Figure 2:
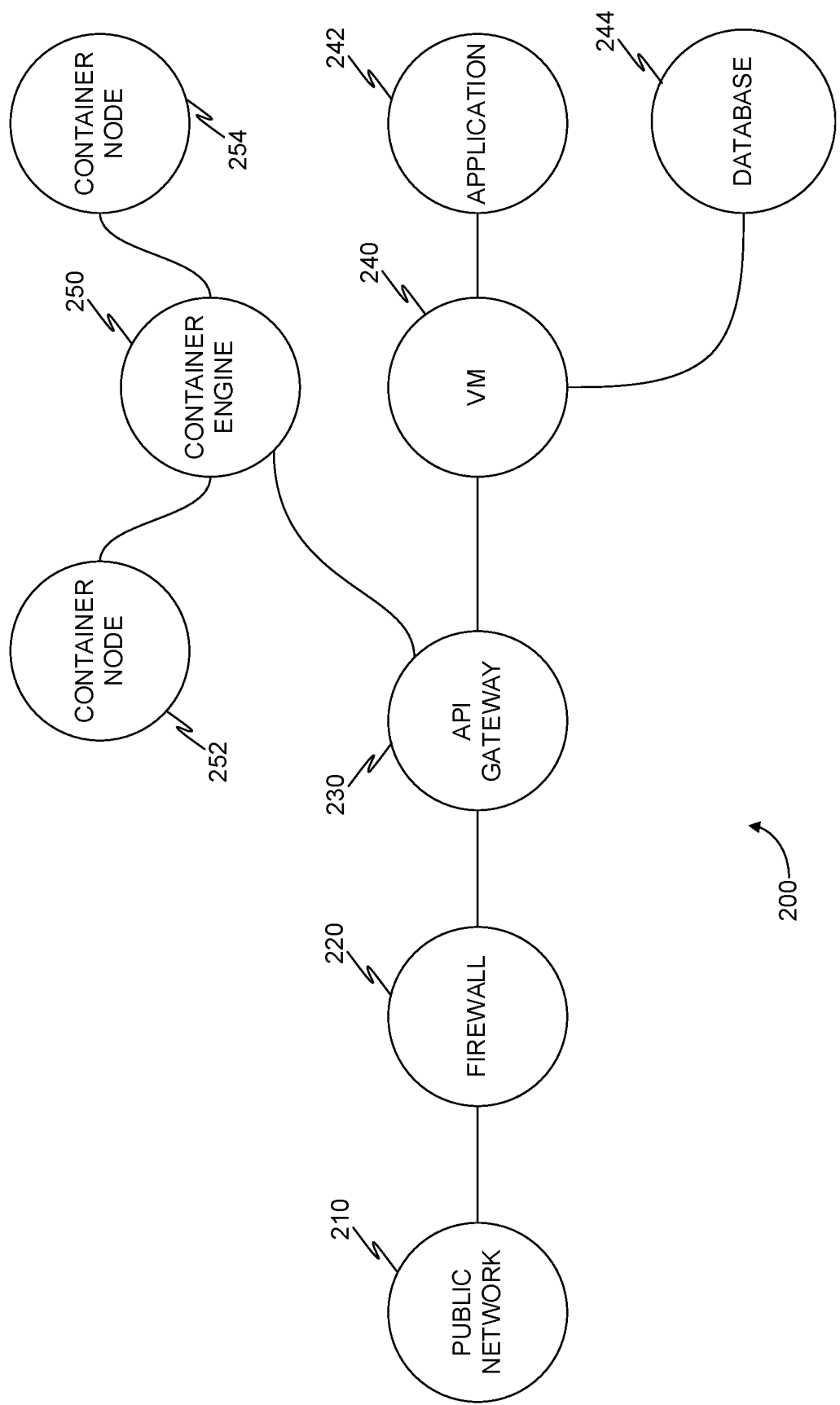
FIG. 2 is an example of a security graph illustrating a network path, implemented in accordance with an embodiment.

FIG. 2 is an example of a security graph 200 illustrating a network path, implemented in accordance with an embodiment. The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 210 (also referred to as public network node 210) represents a public network, such as public network 130 of FIG. 1 above. An enrichment node, such as enrichment node 210, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application and a database, and is also connected to a second principal node 250 (also referred to as container engine node 250) which hosts a plurality of container nodes. The VM node 240 is connected to an application node 242, and a database node 244. The application node 242 may indicate, for example, that a certain application, having a version number, binaries, files, libraries, and the like, is executed on the VM which is represented by the VM node 240.

In an embodiment, the VM node 240 may be connected to a plurality of application nodes. The database node 244 represents a database which is stored on the VM (represented by VM node 240) or stored on a storage accessible by the VM. The database node 244 may include attributes which define a database, such as type (graph, columnar, distributed, etc.), version number, query language, access policy, and the like.

Figure 3:
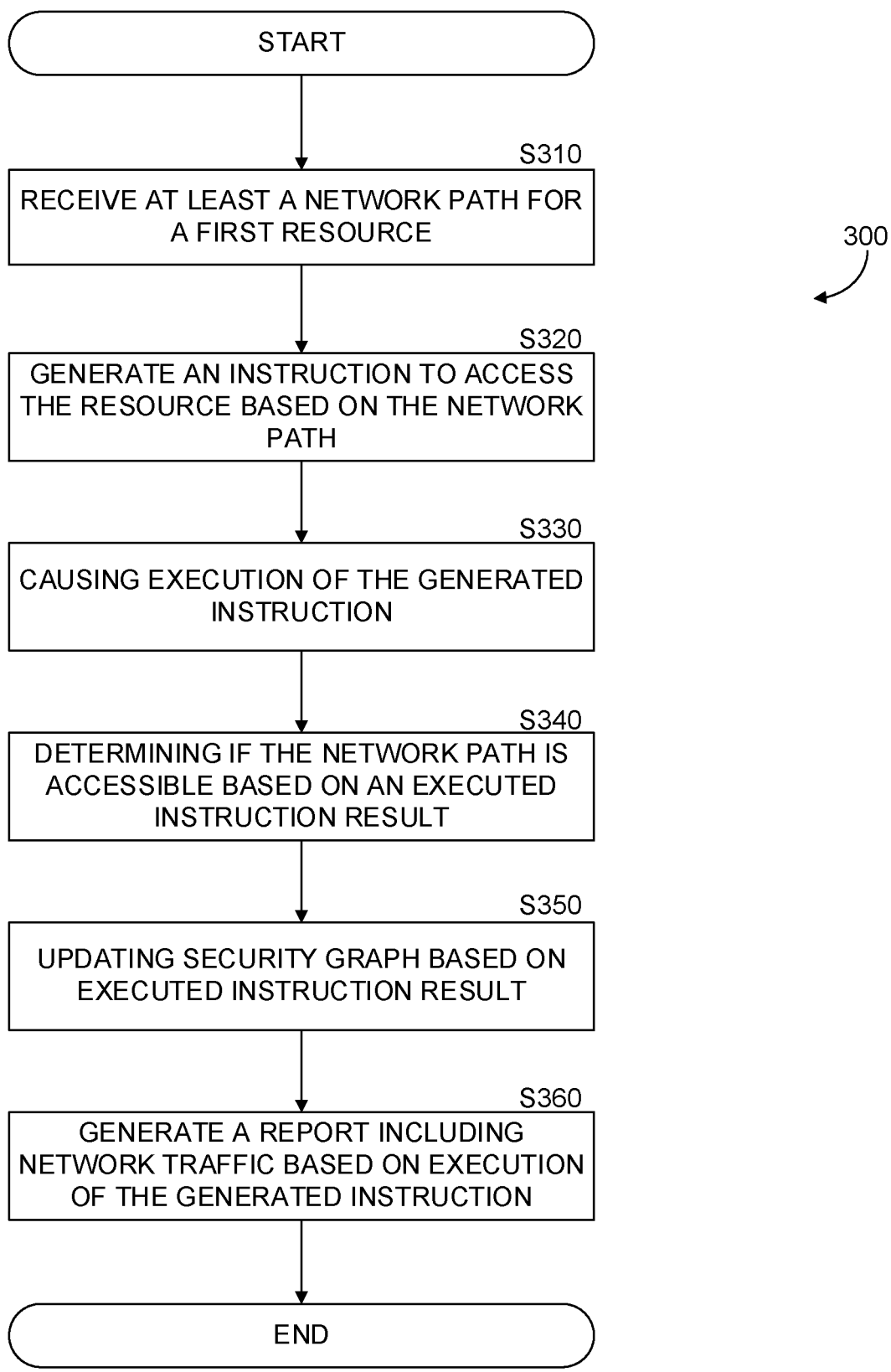
FIG. 3 is an example flowchart of a method for performing active inspection of a cloud computing environment, implemented in accordance with an embodiment.

FIG. 3 is an example flowchart 300A of a method for performing active inspection of a cloud computing environment, implemented in accordance with an embodiment.

At S310, at least one network path for a first resource in a cloud computing environment is received. The network path, also known as object reachability, includes data (e.g. reachability parameters) for accessing the first resource from a public network, which is not the cloud computing environment of the first resource, such as the Internet. In an embodiment, an active inspector may receive the at least a network path, for example from a security graph. In an embodiment, S320 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 4A and 4B below.

At S320, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET /bin HTTP/1.1
Host:10.0.0.127:800 and further generate another HTTP GET request:

GET /bin HTTP/1.1
Host:10.0.0.127:801 and so on, which when executed attempt to access a /bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S330, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S340, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S350, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S360, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 122 may be updated based on the determined viability of the network paths. For example, if a resource is successfully accessed, or successfully un-accessed (i.e., an attempt was made to access the resource and the attempt was not successful in accessing the resource), this result can be stored as an attribute of a node representing the resource in the security graph. For example, the VM node 240 of FIG. 2 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

Figure 5:
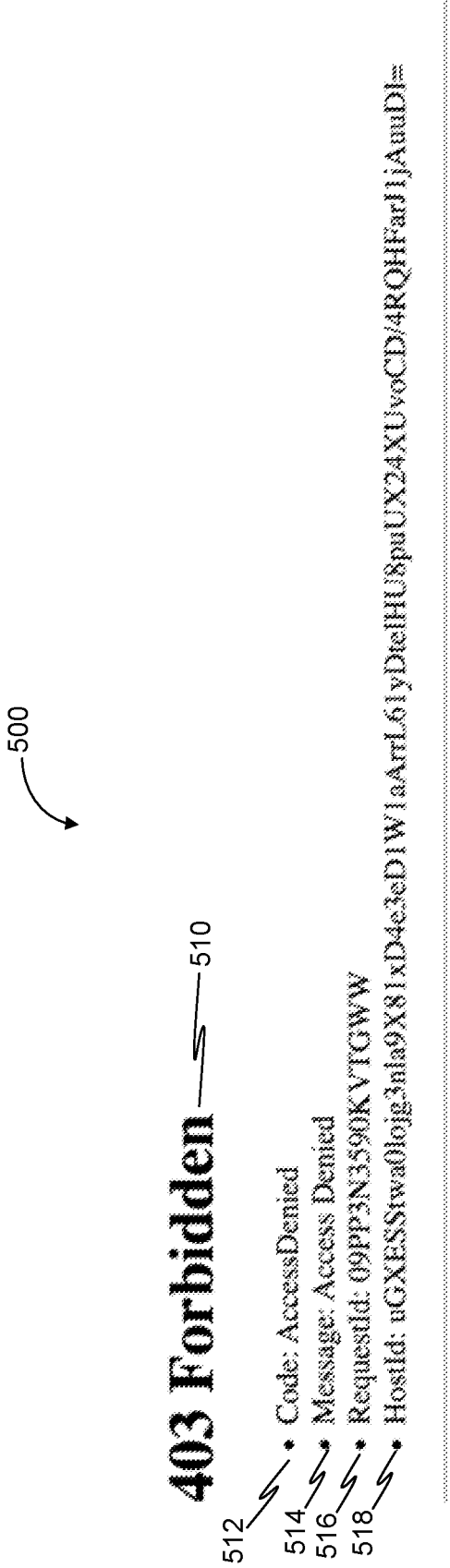
FIG. 5 below is one such example of a screenshot of a user interface, implemented in accordance with an embodiment.

In certain embodiments the active inspector may generate a screenshot of a user interface used to access the resource through the network path. FIG. 5 below is one such example of a screenshot of a user interface, implemented in accordance with an embodiment.

Furthermore, utilizing the active inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

Figure 4A:
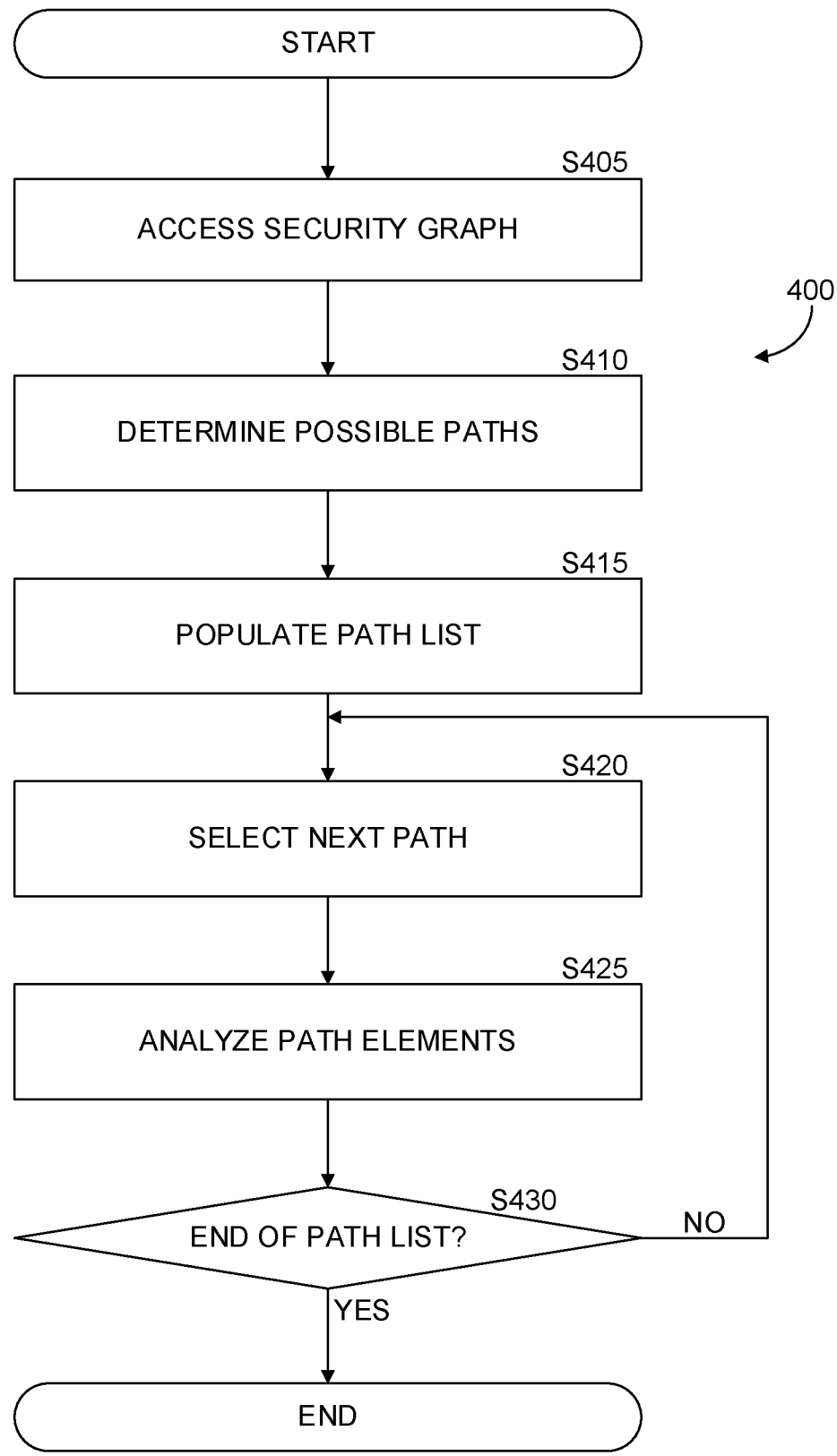
FIG. 4A is an example flowchart depicting a method for determining reachable properties of security objects, according to an embodiment.

FIG. 4A is an example flowchart 400 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S405, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S410, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S410 through S430, the list of paths are iteratively identified to determine the reachability properties of the path. Specifically, at S415, a path list is populated to include all identified paths. A path list may be a table, list, or other type of data structure. A path list may be unordered or ordered, including ordering according to one or more path properties.

At S420, a path from the path list is selected. At a first run of the method a first path in the list is selected.

At S425, path elements are analyzed to determine reachable properties. Path element analysis, as at S425, is an iterative analysis of each element included in the path selected at S420. The operation of S425 is discussed in detail with reference to FIG. 4B.

At S430, it is determined whether the last path of the path list has been analyzed, and if so, execution terminates; otherwise, execution returns to S420.

Figure 4B:
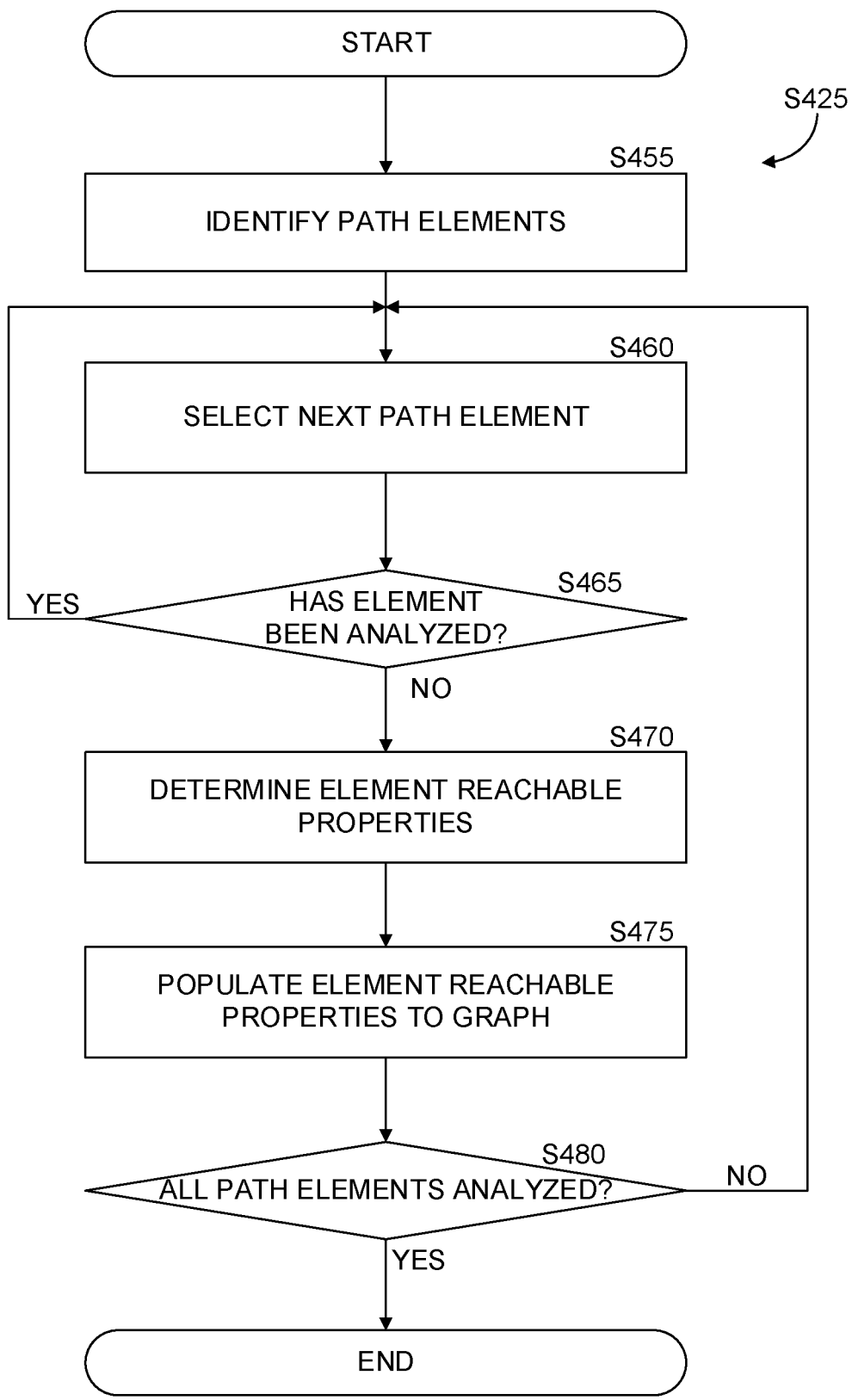
FIG. 4B is an example flowchart S depicting the analysis of a network path to determine reachable properties of objects included in the path, according to an embodiment.

FIG. 4B is an example flowchart S425 depicting the analysis of a network path to determine reachable properties of objects included in the path, according to an embodiment.

At S455, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S410 of FIG. 4A, above, and the like, as well as any combination thereof. Further, identification of in-path elements may include identification of element properties or attributes including, without limitation, names, network addresses, rulesets, port configurations, and the like, as well as any combination thereof.

Then, at S460 through S480, the list of paths are iteratively processed in order to determine reachable properties of the elements. Specifically, at S460, the next element is selected. The next element is a subsequent element of the set of elements, within the selected path, identified at S455. Where execution of S460 follows the execution of S480, the next element may be an element which, in the selected network path, immediately follows the element relevant to the preceding execution of S470 and S475. Where execution of the method described with respect to FIG. 4B includes a first execution of S460, the first execution of S460 may include the selection of a first element of the selected path.

For exemplary purposes, a network path may be a path from a virtual machine (VM), connected to a NIC, connected to a load balancer, connected to a firewall. According to a first example, where S460 is executed for the first time, the first execution of S460 may include the selection of the VM as the selected element. Further, according to a second example, where execution of S460 follows execution of S480, selection of a next element at S460 may include selection of, following the VM, selection of the NIC, or, following the NIC, selection of the load balancer, or, following the load balancer, selection of the firewall.

At S465, it is determined whether the selected element has been analyzed. Determination of whether the selected element may include the determination of whether one or more reachable properties are included in the relevant graph element. As execution of S475 provides for the population of reachable properties into the security graph, an element which does not include such reachable properties in the graph may be assumed to have not been analyzed.

Where, at S465, it is determined that the selected element has been analyzed, execution continues with S460. Where, at S465, it is determined that the selected element has not been analyzed, execution continues with S470.

At S470, reachable properties are determined. Reachable properties are object properties describing if, and how, a given path element is reachable through the selected path, and, specifically, from an external network, an internal network, both, and a combination thereof. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

At S475, reachable properties are populated into the security graph. Reachable properties, as may be determined at S470, may be populated into the graph by processes including, without limitation, labeling or tagging graph vertices (or "nodes"), updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S480, it is determined whether all elements in the selected path have been analyzed. Determination of whether all elements in the selected path have been analyzed may include, without limitation, determination of whether the immediately preceding execution of S475 relates to the last element in the selected path, determination of whether additional elements remain in the path, determination of whether any additional in-path elements have been analyzed, and the like, as well as any combination thereof.

Where, at S480, it is determined that all elements in the selected path have not been analyzed, execution continues with S460. Where, at S480, it is determined that all elements in the selected path have been analyzed, execution terminates.

FIG. 5 is an example of a screenshot 500 generated by an active inspector, implemented in accordance with an embodiment. A screenshot is an image which shows the contents of a computer display. In an embodiment, an active inspector, such as the active inspector 125 of FIG. 1, may include a web browser application for executing access instructions. The web browser application may generate a user interface intended for a display. The screenshot 500 includes a portion of such a user interface, which includes a response header 510 received based on a request to access a resource. In this case the response header 510 includes an HTTP code 403 (i.e., forbidden), meaning that the request to access the resource was denied. A detailed code 512 includes a message which is associated with the 403 code (i.e., "access denied"), a message 514, a request identifier 516, and a host identifier 518.

Figure 6:
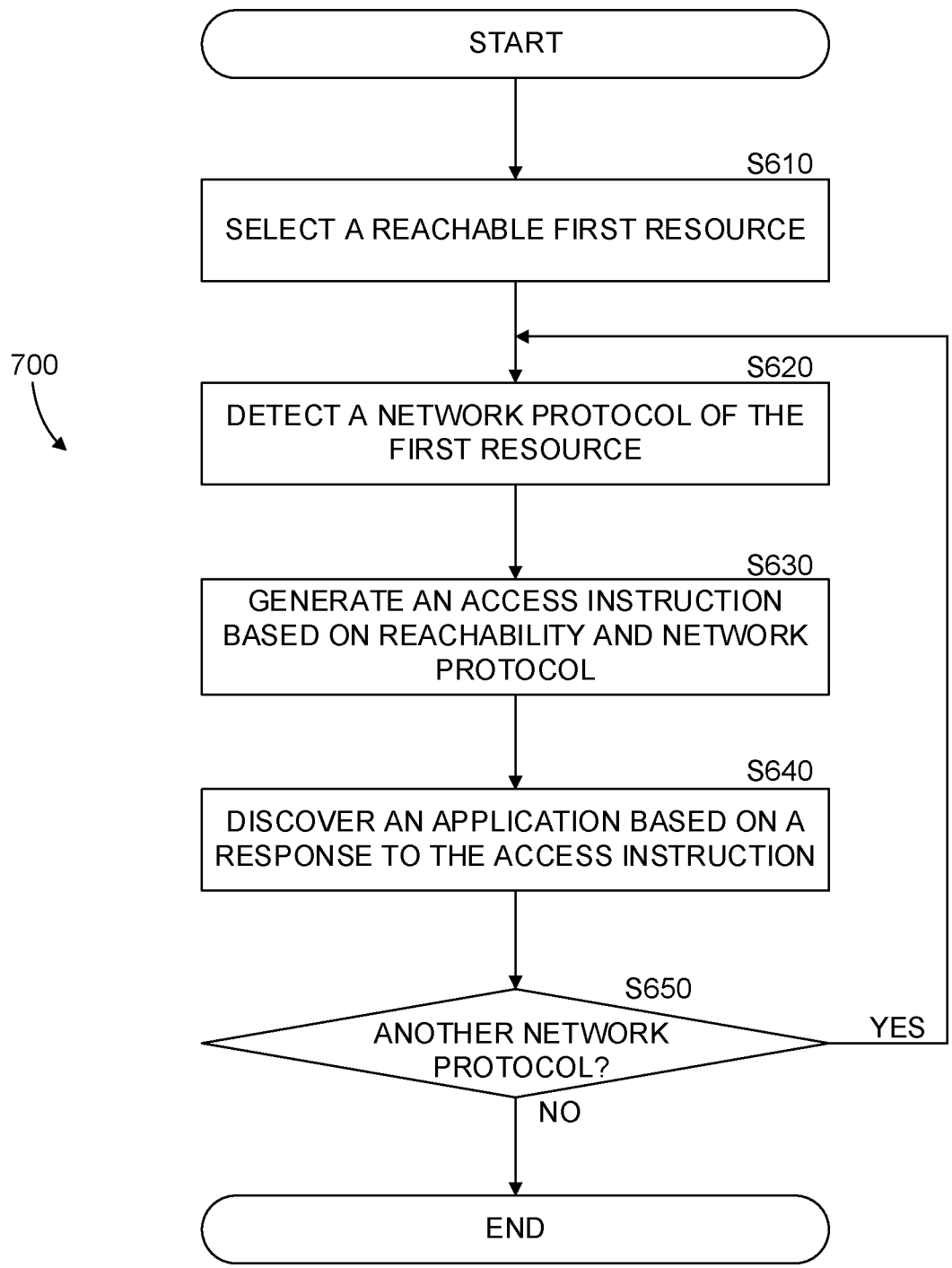
FIG. 6 is an example flowchart of a method for detecting a technology stack utilizing active inspection, implemented in accordance with an embodiment.

FIG. 6 is an example flowchart of a method for detecting a technology stack utilizing active inspection, implemented in accordance with an embodiment. Technology stack is a term used to describe application, operating systems, and the like which are installed or deployed on a resource, such as a virtual machine, which in turn is deployed in a cloud computing environment. For example, Nginx® deployed on a virtual machine having a Linux® operating system has a technology stack (also referred to as a tech stack) which includes Nginx and Linux.

At S610, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S620, a network protocol is detected for the reachable first resource. In an embodiment, the network protocol is a transport layer protocol. For example, the network protocol may be any one of: a TCP protocol, and a UDP protocol. In an embodiment, the network protocol is any one of: hypertext transfer protocol (HTTP), file transfer protocol (FTP), secure shell (SSH), simple mail transfer protocol (SMTP), post office protocol (POP3), internet message access protocol (IMAP), internet relay chat (IRC), HTTP secure (HTTPS), and the like. In certain embodiments, a port may be determined for the network protocol. For example, the first reachable resource may be indicated as listening on (or having open) any one of port: 80, 20, 21, 22, 25, 110, 143, 194, 443, and the like. A port is a communication endpoint, and may be implemented as a 16-bit number.

In some embodiments, a security graph may be queried to determine if the reachable first resource includes an open port. A resource will not actively listen on all ports, as this is over sixty five thousand different port numbers which are possible. In an embodiment, determining that a resource is actively listening on a port may be determined as part of the reachability parameters, for example as detailed above.

An open port is a port which a resource is actively listening for network traffic. While certain ports are considered well known ports (i.e., port 80 is used for HTTP) most are open for general use. Some network ports may be used by multiple applications. For example, port 6600 is used by Microsoft® Hyper-V Live, and by Music Player Daemon, which are two separate applications. Therefore, knowing that a port, or range of ports, is open, does not necessarily indicate what applications are deployed on the first resource.

As another example, port 8080 is used as an alternative for HTTP, used by Apache® Tomcat, and by Atlassian® JIRA applications. Therefore, knowing that a machine is listening on port 8080 does not indicate what applications are present.

At S630, an access instruction for accessing an application of the first resource is generated. In an embodiment the access instruction is based on the network protocol. In certain embodiments, accessing the first resource includes providing the first resource with credentials which allow access to the first resource. For example, a private key may allow accessing an SSH server. As another example, an API gateway, such as the API gateway 230 of FIG. 2 may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server. In certain embodiments, the access instruction is generated based on a predetermined application which is associated with a port number. For example, a table may include a port number in a first column, and a network protocol in a corresponding second column.

In the example above, the first column may indicate 8080, the second column HTTP, another second column Tomcat, and the like. In some embodiments, a predetermined instruction may be stored which corresponds to the predetermined application. For example, the predetermined application may be HTTP, and the predetermined instruction may be a GET command. The access instruction may be further generated based on the predetermined instruction.

At S640, an application is discovered based on a response to the access instruction. In an embodiment, the access instruction, when executed, configures a computing device to initiate a communication over the network path. A response may be, for example, an ack (acknowledgement), which is received from the first resource in response to the access instruction. In an embodiment, a response to an HTTP request may include a status code, such as 500, 404, 200, 202, and the like. In certain embodiments, a security graph may be updated based on the discovered application.

In an embodiment, an application node may be generated in a security graph to represent the discovered application. The application node may be connected with an edge to a resource node representing the reachable first resource node, on which the application is deployed.

Discovering an application using the methods described herein allows to validate a tech stack as part of an external attack surface management (EASM) procedure in an efficient way, since only ports which are indicated, for example by static analysis, as being open are inspected to determine if access may occur. In an embodiment, only predetermined applications are checked for each open port, which further reduces the number of access instructions required to probe open ports, as the alternative is to test each probe for each application, which can easily result in hundreds of thousands of access instructions required to determine what applications are deployed on just a single resource.

At S650, a check is performed to determine if an additional network protocol should be checked. If yes execution may continue at S720. Otherwise, execution may terminate. In an embodiment, the check may be further performed based on a response received based on execution of the access instruction. For example, if the access instruction was not successful, a second access instruction may be generated for example for the same port using a different protocol. In an embodiment the access instruction, second access instruction, and the like, are delivered over the network path of the reachable first resource.

Figure 7:
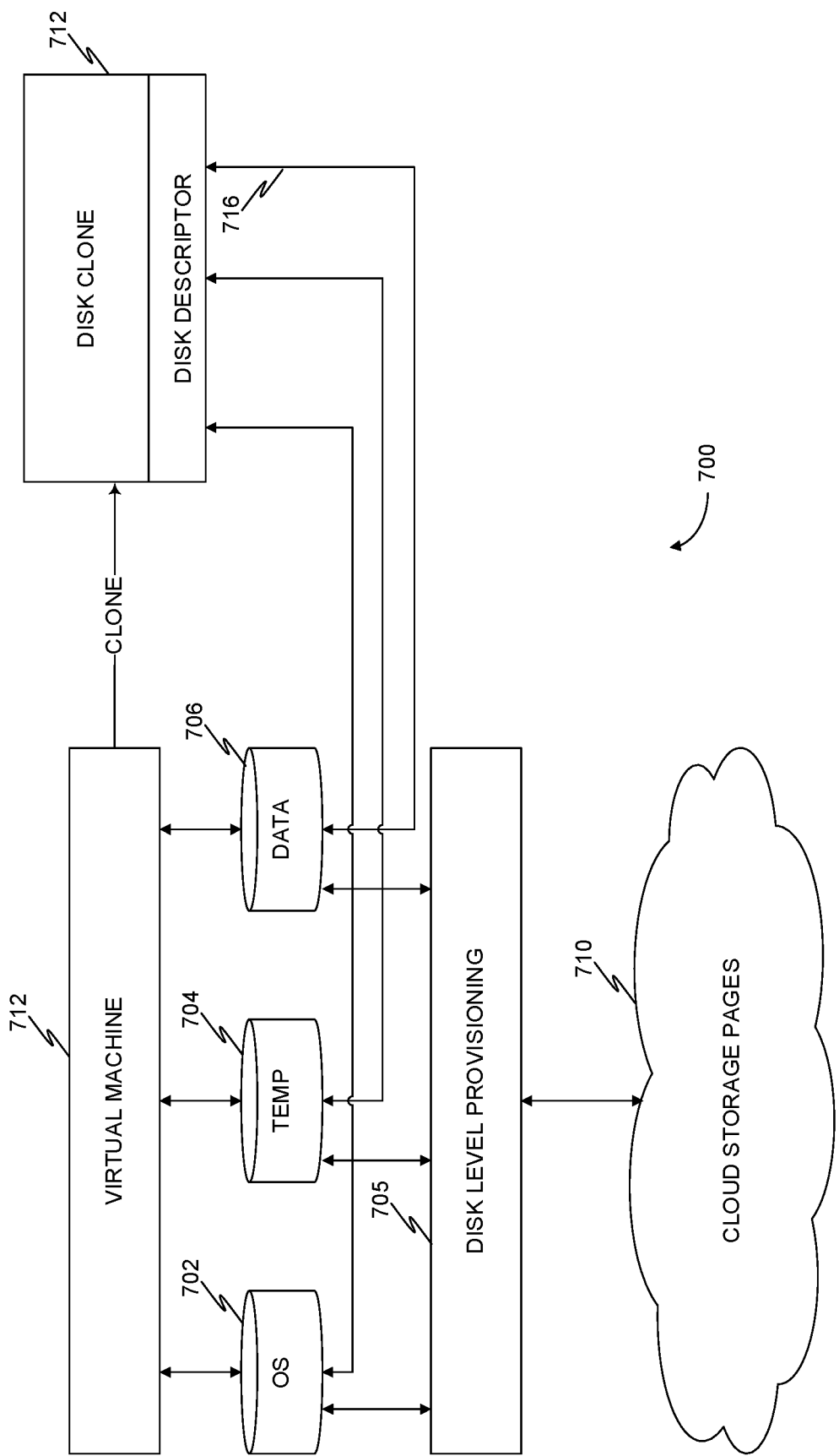
FIG. 7 is an example diagram of a virtual machine and a cloned disk thereof, utilized to describe an embodiment.

FIG. 7 is an example diagram 700 of a virtual machine 113 and a cloned disk thereof, utilized to describe an embodiment. While an Azure® cloud computing infrastructure is discussed here, it should be understood that the teachings herein apply equally to other cloud computing infrastructures which offer equal functionality. The VM 113 includes a plurality of disks allocated to the VM 113. The VM 113 may be deployed only with an OS disk, with an OS disk and a plurality of data disks, and so on.

In this example embodiment the plurality of disks includes an operating system (OS) disk 702, an optional temporary disk 704, and at least a data disk 706. The OS disk 702 includes a preinstalled OS, such as Microsoft® Windows, or Linux®. The preinstalled OS is in a boot volume of the OS disk 702. The optional temporary disk 704 may be used for storing temporary data, such as page files, swap files, and the like. The data disk 706 may be used for storing an application, application code, libraries, binaries, application data, and the like. In an embodiment, a plurality of data disks 706 may be allocated to the VM 113. In some configurations, a disk of the plurality of disks may be encrypted. For example, the OS disk 702, and the data disk 706 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 113 by a disk level provisioning 705. In an embodiment, the disk level provisioning 705 is an application deployed in a cloud computing infrastructure. The disk level provisioning 705 provisions hardware resource to the VM 113 which results in allocation of a disk. The hardware resources are provisioned from cloud storage pages 710 of the cloud computing infrastructure. The hardware resources may be solid state device (SSD) storage, hard disk drive (HDD) storage, optical storage, other magnetic storage, and the like. In an example embodiment, the cloud storage pages 710 are Azure page blobs. A page blob is a collection of a pages, each page having a predetermined size. For example, the predetermined size may be 512-bytes per page.

A disk clone 712 (also referred to as cloned disk 712) includes a disk descriptor which includes a reference to an address of a disk of the VM 113. In certain cloud computing infrastructures, when a disk is cloned, a pointer, such as pointer 716 is used to point to an original disk, in this example the data disk 706. In an embodiment, this may be achieved by dereferencing a pointer of the VM 113 which points to the data disk 706, and generating the pointer 716 for the cloned VM 712 to point to the data disk 706. In certain embodiments where a disk is encrypted, a pointer may be generated for the cloned VM 712 to the encryption key.

In an embodiment, the cloning process generates the disk clone 712 as a background process. This is possible due to utilizing diffs. A diff is an additional content that includes the difference between a content at one point in time (e.g., when the original disk was cloned) and a second, later, point in time. Thus, the VM 113 may access the data disk 706 and any diffs generated, or committed, after the disk clone 712 is generated, whereas the disk clone 712 may access only the content of the original data disk 706, and cannot access any diffs generated since.

The cloned disk 712 may then be inspected by an inspector, such as the inspector 124 of the inspection environment 120 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller, such as the controller 126 of FIG. 1, may determine if inspecting a virtual instance requires generating a disk clone or a snapshot. In an embodiment, the determination is performed based on the geographic location of the VM 113, an intended geographic location into which a disk of the VM 113 is cloned, a geographic location of the inspection environment, a number of disks allocated to the virtual instance, or any combination thereof.

By inspecting a cloned disk 712 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 712 is complete, the cloned disk 712 may be spun down, releasing any resources allocated to it, and removing the pointers pointing to the disks of the virtual machine. In an embodiment, the cloned disk 712 may be deleted to accomplish spinning down.

Figure 8:
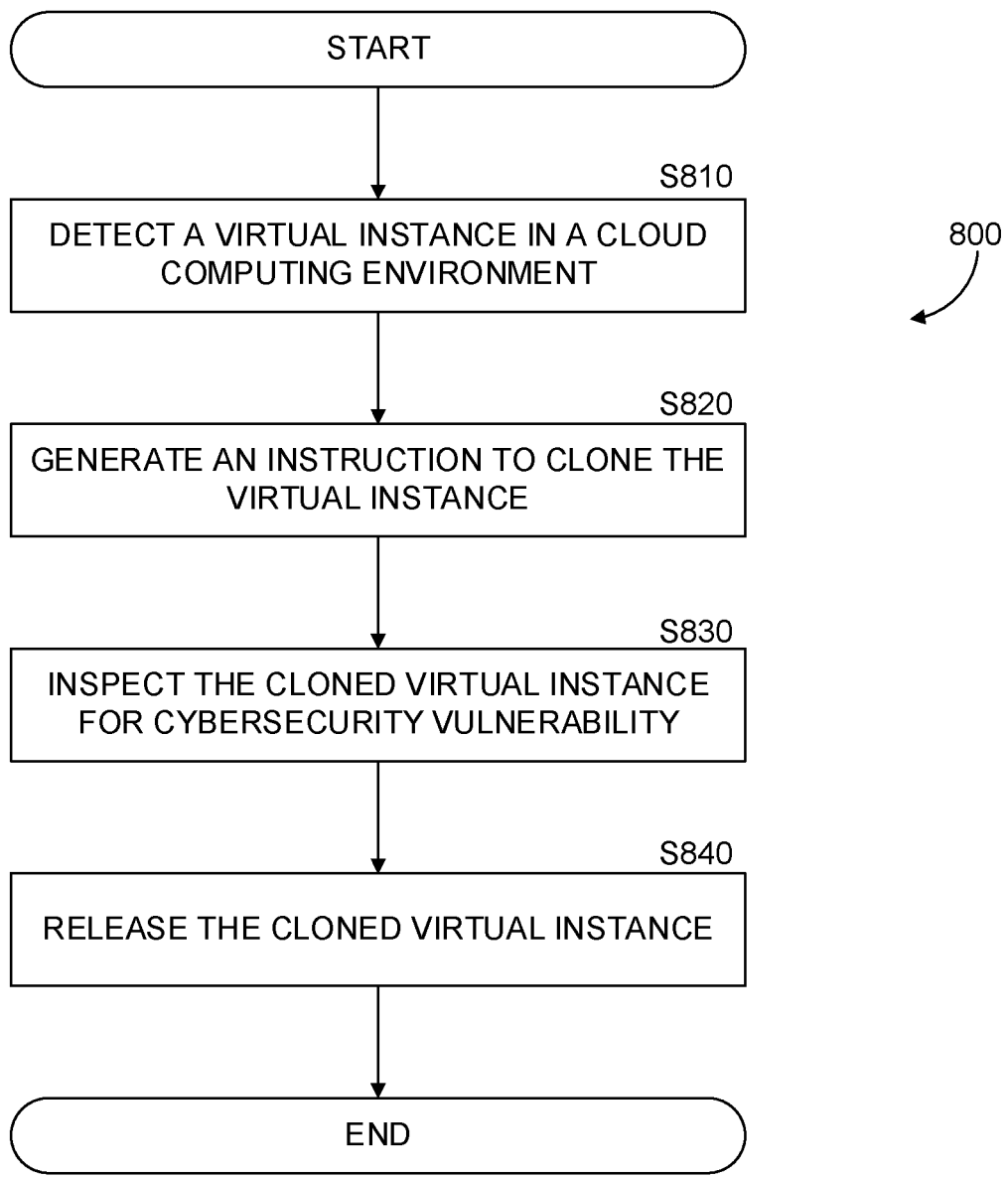
FIG. 8 is an example flowchart of a method for generating a disk clone of a virtual instance for vulnerability inspection according to an embodiment.

FIG. 8 is an example flowchart 800 of a method for generating a disk clone of a virtual instance for vulnerability inspection according to an embodiment.

At S810, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S820, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S830, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S840, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 9:
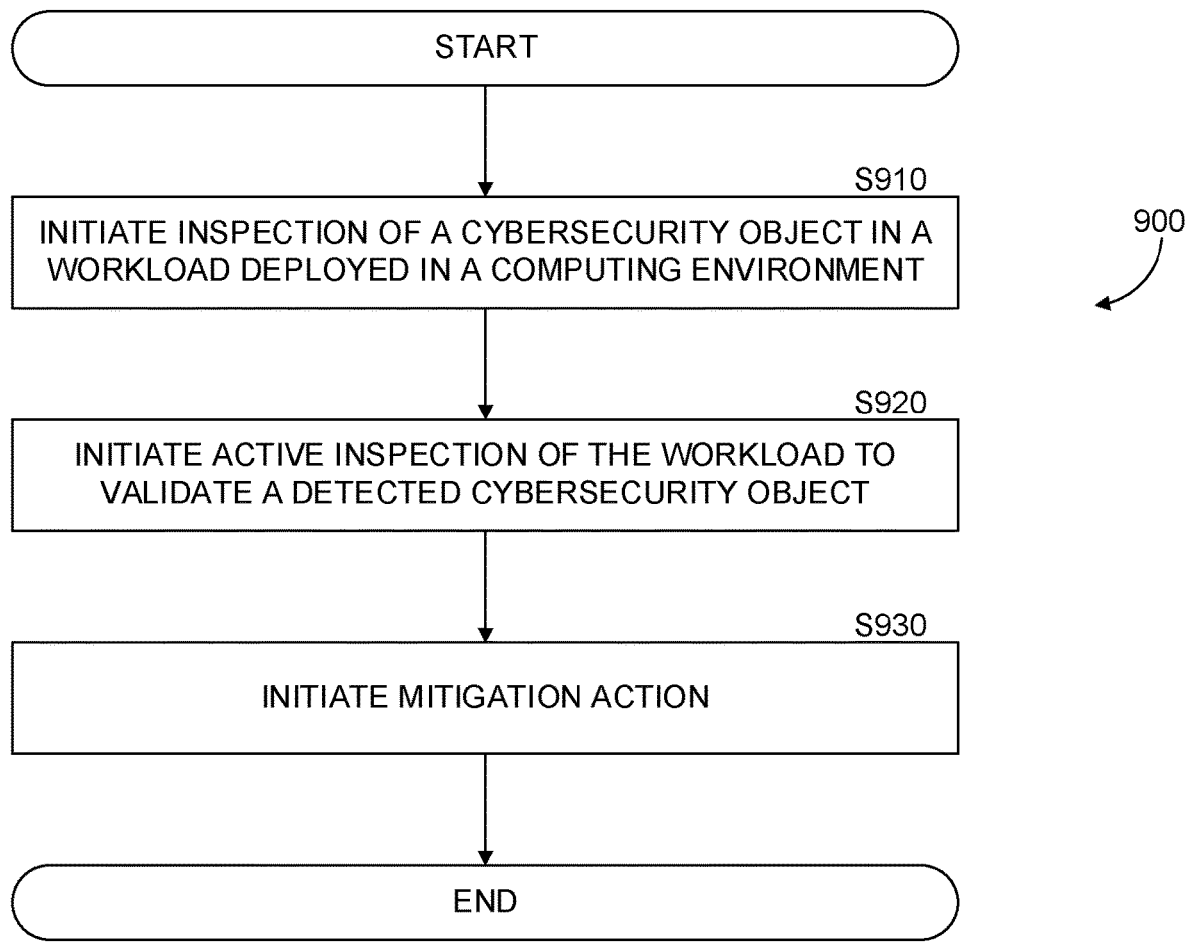
FIG. 9 is an example flowchart of a method for validating a technology stack utilizing active inspection, implemented in accordance with an embodiment.

FIG. 9 is an example flowchart 900 of a method for validating a technology stack utilizing active inspection, implemented in accordance with an embodiment.

At S910, inspection of a workload is initiated. In an embodiment, inspecting a workload includes detecting a disk associated with a workload in a computing environment, and generating a clone of the disk (i.e., a cloned disk), and inspecting the cloned disk for a cybersecurity object.

In an embodiment, a cybersecurity object is a password, a certificate, a file, a folder, a registry file, an application, an operating system, a code object, a nested workload, a malware object, a vulnerability, a misconfiguration, an exposure, various combinations thereof, and the like.

In some embodiments, inspection includes detecting a cybersecurity issue. In an embodiment, a cybersecurity issue is detected based on a cybersecurity object, a plurality of cybersecurity objects, and the like. For example, in an embodiment, a cybersecurity issue is detected based on detecting an application and a misconfiguration.

In an embodiment, an inspection includes generating an inspection result. For example, an inspection result includes identifiers of cybersecurity objects detected on a workload. In certain embodiments, the inspection results are stored in a security database, such as the security database 122 of FIG. 1.

At S920, active inspection is initiated. In an embodiment, active inspection is initiated in response to detecting a cybersecurity object on a workload. For example, in certain embodiments, a cybersecurity object is detected on a workload. In an embodiment, the cybersecurity object indicates a potential cybersecurity issue. In order to validate the cybersecurity object it is advantageous to initiate active inspection, for example to determine if the cybersecurity issue is an actual issue or a potential issue.

In an embodiment, active inspection is performed to validate a technological stack. For example, in an embodiment, a technology stack includes an operating system, an application, a network port, a network address, a combination thereof, and the like. As an example, in an embodiment, an operating system and an application are each cybersecurity objects which indicate a potential cybersecurity issue, for example leading to exposing the workload on which they are deployed. In an embodiment, active inspection allows to determine if the potential cybersecurity issue (e.g., exposed resource) is a real issue (i.e., an issue that exists and an attacker could take advantage of) or is only a potential issue (e.g., the issue exists, but an attacker cannot take advantage of it since active inspection failed to reach the resource).

At S930, a mitigation action is initiated. In an embodiment, a mitigation action is initiated in response to determining that a potential cybersecurity issue is a validated cybersecurity issue. For example, according to an embodiment, a potential cybersecurity issue is validated by initiating active inspection of a resource and determining that a cybersecurity object can be utilized in a manner which results in a cybersecurity threat.

In an embodiment, a mitigation action includes a remediation action. In some embodiments, a remediation action is based on a predetermined remediation script, including a plurality of actions which are initiated in the computing environment. For example, in an embodiment, a remediation action includes revoking access from a principal, revoking access to a principal, revoking access from a resource, revoking access to a resource, sandboxing a resource, quarantining a resource, changing a permission, removing a permission, updating a policy of the computing environment, a combination thereof, and the like.

Figure 10:
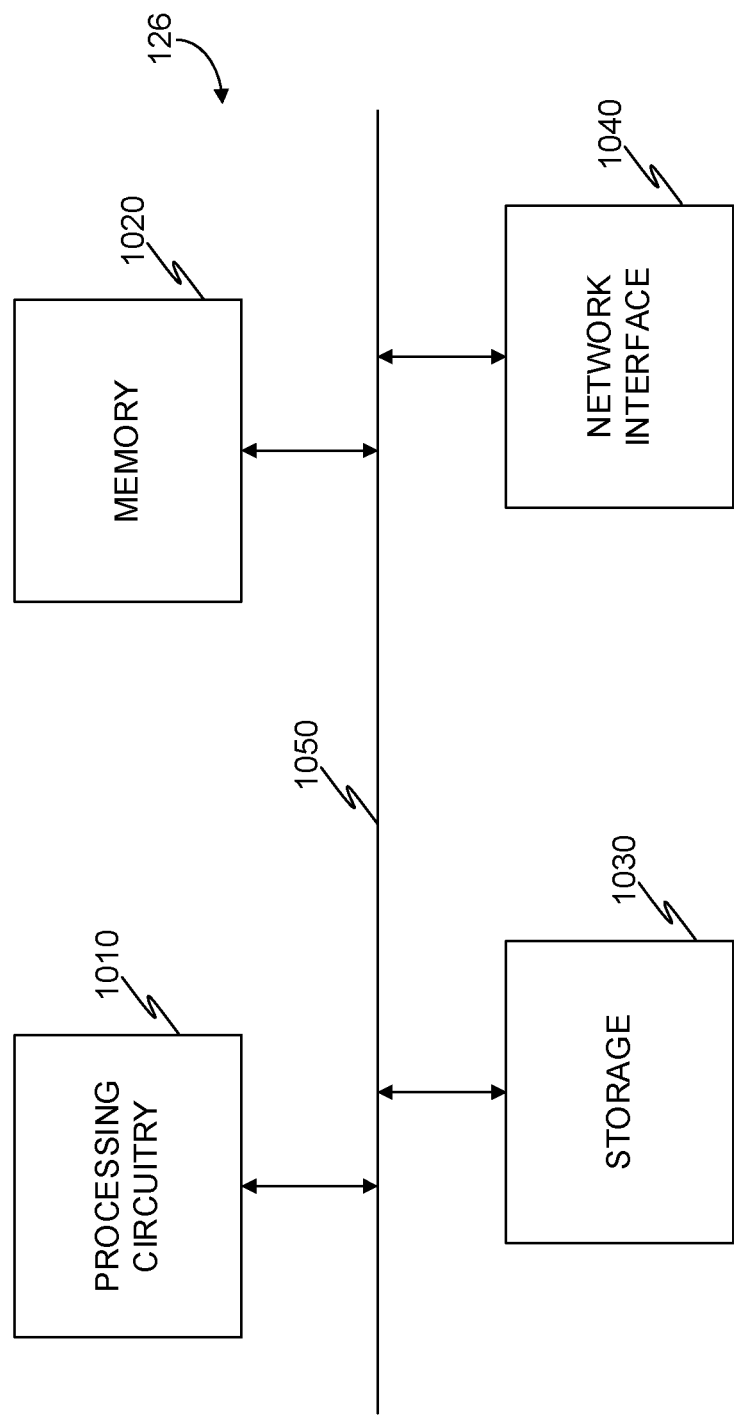
FIG. 10 is an example schematic diagram of an inspection controller according to an embodiment.

FIG. 10 is an example schematic diagram of an inspection controller 126 according to an embodiment. The inspection controller 126 includes a processing circuitry 1010 coupled to a memory 1020, a storage 1030, and a network interface 1040. In an embodiment, the components of the inspection controller 126 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the inspection controller 126 to communicate with, for example, a computing environment 110, a security database 122, resources of the computing environment, and the like.

It should be understood that the embodiments described herein are not limited to the specific architecture illustrated in FIG. 10, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for technology stack discovery by performing active inspection of a cloud computing environment utilizing disk cloning, comprising:
    generating an inspectable disk based on an original disk of a reachable resource, wherein the reachable resource is a cloud object deployed in the cloud computing environment, and accessible from a network which is external to the cloud computing environment;
    detecting a cybersecurity object on the inspectable disk, the cybersecurity object indicating a cybersecurity issue;
    selecting a network path including a network protocol to access the reachable resource;
    generating an access instruction, wherein the access instruction when executed configures a computing device to send an instruction to the reachable resource over the network path, causing the reachable resource to send a response; and
    actively inspecting the network path to detect the cybersecurity issue, wherein actively inspecting includes inspecting the network path to determine if an application utilizing the network protocol is deployed on the reachable resource as part of a technology stack of the reachable resource.

2. The method of claim 1, further comprising:
    determining that an application is deployed in response to receiving a response from the reachable resource corresponding to the network protocol; and
    determining that the application is not deployed in response to receiving an error response from the reachable resource.

3. The method of claim 1, wherein the network protocol is any one of:
    hypertext transfer protocol (HTTP), file transfer protocol (FTP), secure shell (SSH), simple mail transfer protocol (SMTP), post office protocol (POP3), internet message access protocol (IMAP), internet relay chat (IRC), and HTTP secure (HTTPS).

4. The method of claim 1, further comprising:
    querying a security database to detect an open port of the reachable resource, wherein the security database includes a representation of the cloud computing environment.

5. The method of claim 4, wherein the open port is associated with the network protocol and another network protocol.

6. The method of claim 5, further comprising:
    generating a first access instruction based on the network path and the network protocol; and
    generating a second access instruction based on the network path and the another network protocol.

7. The method of claim 6, further comprising:
    actively inspecting the network path by executing the second access instruction, in response to receiving an error from the reachable resource in response to executing the first access instruction.

8. A non-transitory computer-readable medium storing a set of instructions for technology stack discovery by performing active inspection of a cloud computing environment utilizing disk cloning, the set of instructions comprising:
    one or more instructions that, when executed by one or more processors processing circuitries of a device, cause the device to:
    generate an inspectable disk based on an original disk of a reachable resource, wherein the reachable resource is a cloud object deployed in the cloud computing environment, and accessible from a network which is external to the cloud computing environment;
    detect a cybersecurity object on the inspectable disk, the cybersecurity object indicating a cybersecurity issue;
    select a network path including a network protocol to access the reachable resource;
    generate an access instruction, wherein the access instruction when executed configures a computing device to send an instruction to the reachable resource over the network path, causing the reachable resource to send a response;
    and actively inspect the network path to detect the cybersecurity issue, wherein actively inspecting includes inspecting the network path to determine if an application utilizing the network protocol is deployed on the reachable resource as part of a technology stack of the reachable resource.

9. A system for technology stack discovery by performing active inspection of a cloud computing environment utilizing disk cloning comprising:
    a processing circuitry;
    a memory, the memory containing instructions that, when executed by the processing circuitry, configure the system to:
    generate an inspectable disk based on an original disk of a reachable resource, wherein the reachable resource is a cloud object deployed in the cloud computing environment, and accessible from a network which is external to the cloud computing environment;
    detect a cybersecurity object on the inspectable disk, the cybersecurity object indicating a cybersecurity issue;

select a network path including a network protocol to access the reachable resource;

generate an access instruction, wherein the access instruction when executed configures a computing device to send an instruction to the reachable resource over the network path, causing the reachable resource to send a response; and actively inspect the network path to detect the cybersecurity issue, wherein actively inspecting includes inspecting the network path to determine if an application utilizing the network protocol is deployed on the reachable resource as part of a technology stack of the reachable resource.

10. The system of claim 9, wherein the memory contains further instructions which when executed by the processing circuitry further configure the system to:

determine that an application is deployed in response to receiving a response from the reachable resource corresponding to the network protocol; and determine that the application is not deployed in response to receiving an error response from the reachable resource.

11. The system of claim 9, wherein the network protocol is any one of:

hypertext transfer protocol (HTTP), file transfer protocol (FTP), secure shell (SSH), simple mail transfer protocol (SMTP), post office protocol (POP3), internet message access protocol (IMAP), internet relay chat (IRC), and HTTP secure (HTTPS).

12. The system of claim 9, wherein the memory contains further instructions which when executed by the processing circuitry further configure the system to:

query a security database to detect an open port of the reachable resource, wherein the security database includes a representation of the cloud computing environment.

13. The system of claim 12, wherein the open port is associated with the network protocol and another network protocol.

14. The system of claim 13, wherein the memory contains further instructions which when executed by the processing circuitry further configure the system to:

generate a first access instruction based on the network path and the network protocol; and generate a second access instruction based on the network path and the another network protocol.

15. The system of claim 14, wherein the memory contains further instructions which when executed by the processing circuitry further configure the system to:

actively inspect the network path by executing the second access instruction, in response to receiving an error from the reachable resource in response to executing the first access instruction.

* * * * *